United States Patent
Ajumobi

(10) Patent No.: US 11,891,163 B2
(45) Date of Patent: Feb. 6, 2024

(54) AXIAL FLOW DUCTED FAN WITH A MOVABLE SECTION

(71) Applicant: SUPRA LUMINA TECHNOLOGIES INC., Brampton (CA)

(72) Inventor: Ayorinde Olusola Ajumobi, Brampton (CA)

(73) Assignee: SUPRA LUMINA TECHNOLOGIES INC., Brampton (CA)

( * ) Notice: Subject to any disclaimer, the term of this patent is extended or adjusted under 35 U.S.C. 154(b) by 0 days.

(21) Appl. No.: 18/110,391

(22) Filed: Feb. 16, 2023

(65) Prior Publication Data

US 2023/0242244 A1 Aug. 3, 2023

Related U.S. Application Data

(63) Continuation of application No. 16/913,174, filed on Jun. 26, 2020, now Pat. No. 11,584,509.

(60) Provisional application No. 62/953,681, filed on Dec. 26, 2019, provisional application No. 62/867,771, filed on Jun. 27, 2019.

(51) Int. Cl.
*B64C 11/00* (2006.01)
*B64C 29/00* (2006.01)

(52) U.S. Cl.
CPC ........ *B64C 11/001* (2013.01); *B64C 29/0016* (2013.01)

(58) Field of Classification Search
CPC . F04D 29/545; F04D 29/5247; B64C 11/001; B64C 27/20; B64C 29/0033; B64C 29/0016; B63H 1/16
See application file for complete search history.

(56) References Cited

U.S. PATENT DOCUMENTS 3,623,494 A * 11/1971 Poucher .................. F02C 7/042
                                                         137/15.2
3,664,612 A *  5/1972 Skidmore et al. ..... B64D 33/02
                                                         137/15.1

(Continued)

FOREIGN PATENT DOCUMENTS

CN          101973391          2/2011
CN          105966601          1/2018

OTHER PUBLICATIONS

Effects of Duct Lip Shaping and Various Control Devices on the Hover and Forward Flight Performance of Ducted Fan UAV's, Will E. Graf, May 13, 2005.

(Continued)

*Primary Examiner* — Joshua J Michener
*Assistant Examiner* — Cindi M Curry
(74) *Attorney, Agent, or Firm* — Alexander Pokot; AP Patents

(57) ABSTRACT

A ducted fan propulsion comprises a duct with a cutout and a movable duct section that is moved between a retracted position within the cutout and am extended position relative to the duct. An actuator is disposed within the duct wall and is connected to the movable duct section with actuating linkage. A control linkage connects the movable duct section to the cutout edges. The movable duct section is extended when the ducted fan propulsion transitions from vertical takeoff to a level flight or transitions from level flight to a vertical landing. The movable duct section is retracted into cutout an becomes integrated with the duct during level flight.

20 Claims, 30 Drawing Sheets

(56) References Cited

U.S. PATENT DOCUMENTS

| | | | |
|---|---|---|---|
| 3,883,095 A * | 5/1975 | Fletcher | B64D 33/02 |
| | | | 137/15.1 |
| 5,410,992 A * | 5/1995 | Hunt | F04D 29/545 |
| | | | 416/169 A |
| 6,260,567 B1 | 1/2001 | Gruensfelder et al. | |
| 8,205,430 B2 | 6/2012 | Jain | |
| 8,408,491 B2 | 4/2013 | Jain et al. | |
| 8,651,432 B2 | 2/2014 | De Roche | |
| 8,821,123 B2 | 9/2014 | Camci et al. | |
| 9,085,355 B2 | 7/2015 | Delorean | |
| 9,783,315 B2 * | 10/2017 | James | B64D 29/08 |
| 9,845,152 B2 | 12/2017 | Stan | |
| 10,752,371 B2 * | 8/2020 | Cheung | B64D 27/24 |
| 2011/0217163 A1 * | 9/2011 | Camci | F04D 29/541 |
| | | | 415/220 |
| 2018/0308684 A1 | 10/2018 | Thomas | |
| 2022/0018309 A1 * | 1/2022 | Wylie | F02C 7/20 |

OTHER PUBLICATIONS

Inlet Flow Separation Control via Novel Lip-Spoilers for Ducted Fan Based VTOL Uninhabited Ariel Vehicles, Centgz Camci, Nicholas Herwig, Ali Aktork, Oct. 4, 2018.

* cited by examiner

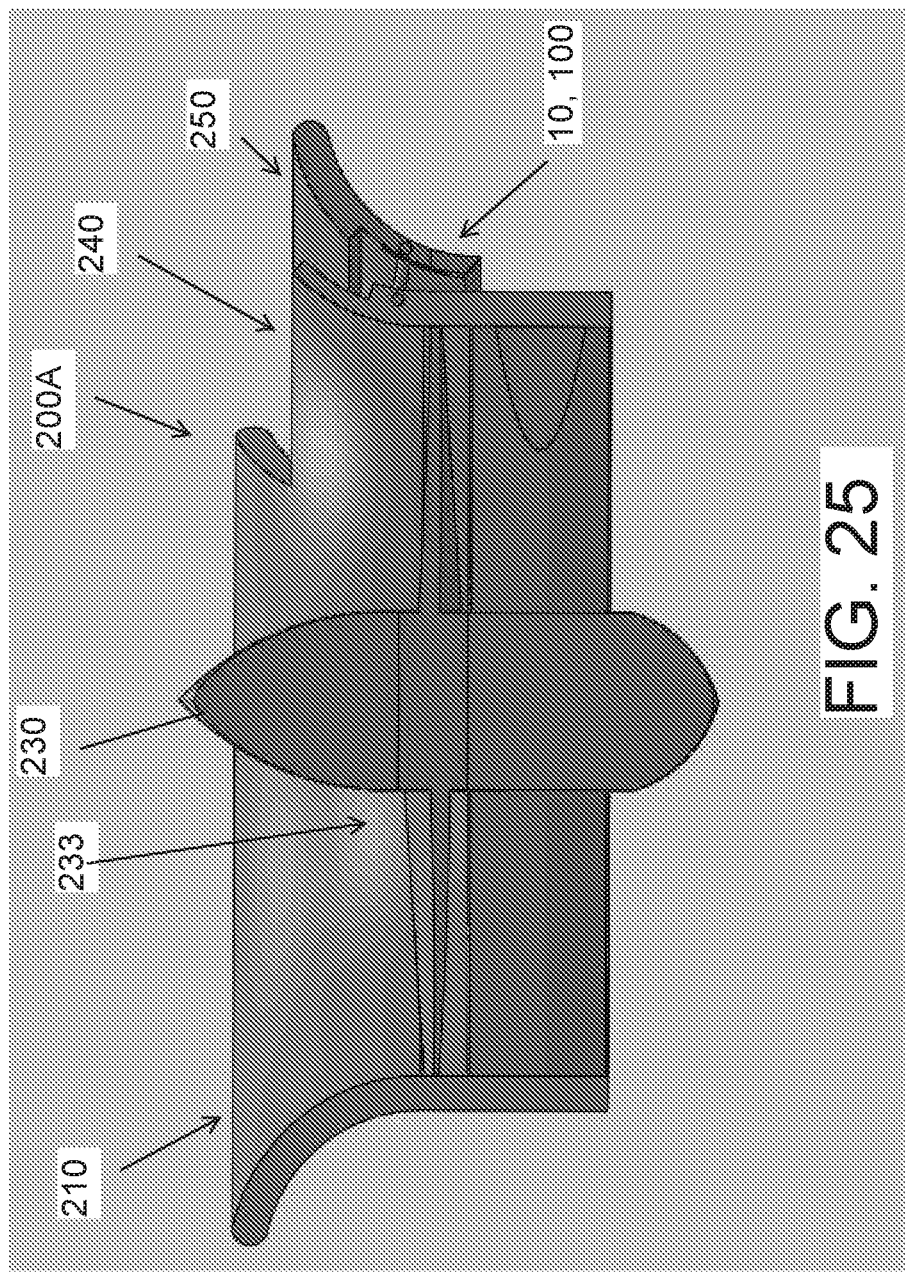

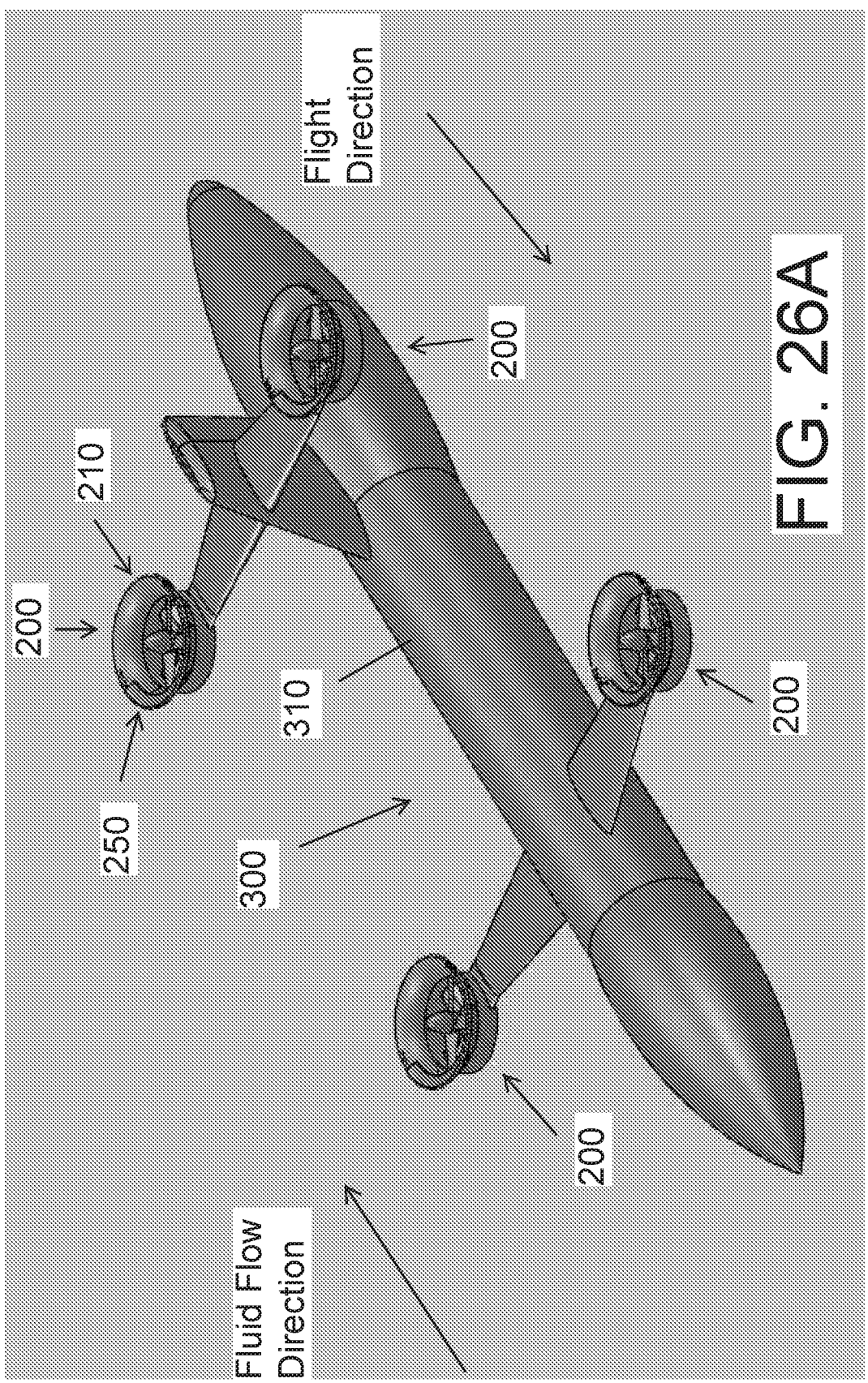

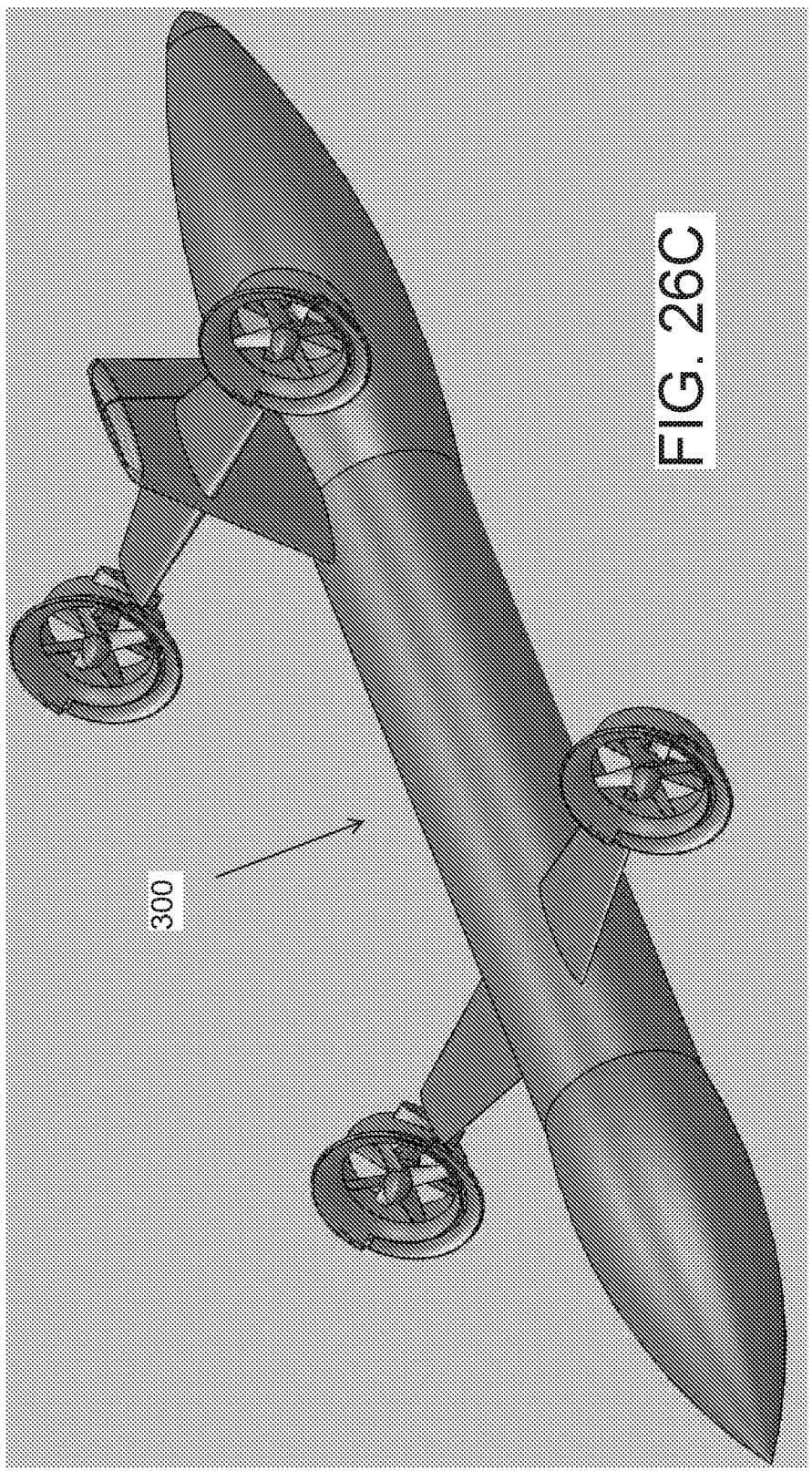

AXIAL FLOW DUCTED FAN WITH A MOVABLE SECTION

CROSS-REFERENCE TO RELATED APPLICATIONS

This present nonprovisional application claims benefit of and priority from U.S. Provisional Patent Application Ser. No. 62/953,681 filed on Dec. 26, 2019 and from U.S. Provisional Patent Application Ser. No. 62/867,771 filed on Jun. 27, 2019, the entire contents of which are hereby incorporated by reference thereto.

TECHNICAL FIELD

The subject matter relates to vehicle propulsion. It further relates to axial flow ducted fans with a movable duct section.

BRIEF DESCRIPTION OF THE DRAWINGS

The accompanying drawings are incorporated in and constitute part of the specification and illustrate various embodiments. In the drawings:

FIG. 25 illustrates a partial elevation view of a ducted fan propulsion of FIG. 24;

FIGS. 26A-D illustrate a perspective view of a vehicle employing the movable duct section and further illustrating a movement diagram of the ducted fan propulsion in a transition between VTOL and level flight.

DETAILED DESCRIPTION

Figure 1:
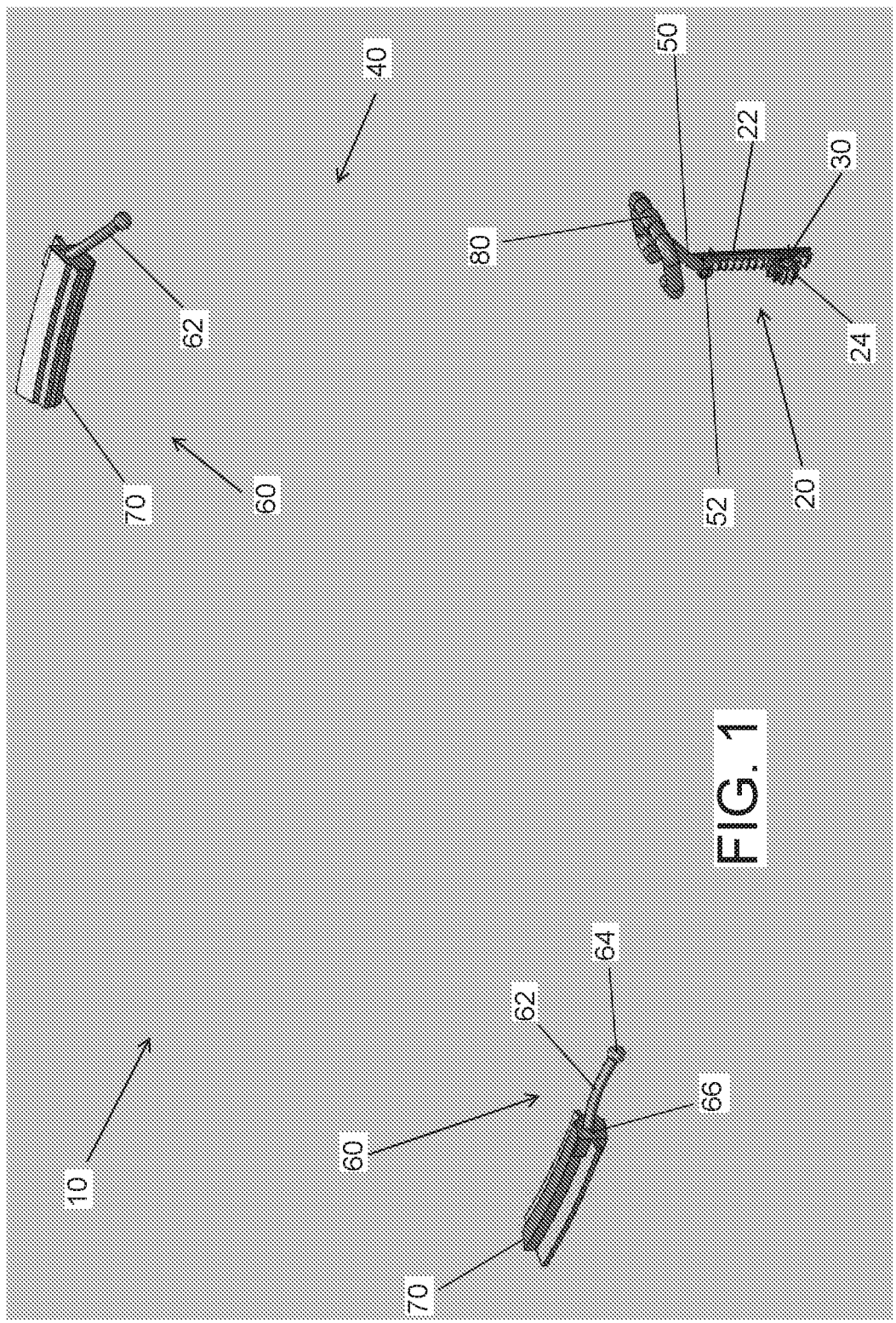
FIG. 1 illustrates an exploded perspective view of an apparatus designed to move a movable duct section.

Prior to proceeding to the more detailed description of the present disclosure, it should be noted that, for the sake of clarity and understanding, identical components which have identical functions have been identified with identical reference numerals throughout the several views illustrated in the drawing figures.

As may be used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

Anywhere the term "comprising" is used, embodiments and components "consisting essentially of" and "consisting of" are expressly disclosed and described herein."

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes here, the words "comprising," "including," "having," and variants thereof, wherever they appear, shall be construed as open-ended terminology, with the same meaning as if the phrase "at least" were appended after each instance thereof.

It is to be understood that the singular forms "a," "an," and "the" include plural referents unless the context clearly dictates otherwise. Thus, for example, reference to "a component surface" includes reference to one or more of such surfaces.

The verb "may" is used to designate optionality/noncompulsoriness. In other words, something that "may" can, but need not. In the present disclosure, the verb "comprise" may be understood in the sense of including.

Before elucidating the subject matter shown in the Figures, various teachings of the present disclosure will first be described in general terms.

General Description

The present disclosure teaches an apparatus that is designed to move a movable wall section of a hollow ducted fan housing between two terminal positions. The apparatus will be illustrated and described as a movable duct section in a propulsion of a vertical takeoff and landing (VTOL) vehicle. The movable duct section can be also referred to in this document as movable sidewall section of the duct sidewall. The vehicle propulsion includes a duct that comprises a hollow housing and a cutout in the duct at a leading edge of the duct, traversing the inner and outer wall surfaces thereof. The duct comprises an exterior surface and an interior surface. The interior surface is spaced at a distance from the exterior surface to define a duct thickness. The leading edge of the duct is being disposed radially to a flow axis of the propulsion. The leading edge defines an inlet of the vehicle propulsion. The cutout in the duct interrupts the leading edge. The cutout in the duct defines two side edges. Each side edge is generally disposed in a plane being generally aligned with a direction of the flow axis. The cutout also defines a leading edge. The leading edge of the cutout is disposed in a plane being generally normal to the flow axis. The movable duct section comprises two ends that are spaced apart from each other to define a length of the movable duct section comprises. The movable duct section also comprises a leading (exterior) edge and an interior edge. The movable duct section further comprises an exterior surface and an interior surface. The interior surface is disposed at a distance from the exterior surface to define a thickness of the movable duct section. The movable duct section comprises a curved shape. The movable duct section is curved between the ends. The movable duct section may be also curved between the interior and exterior (leading) edges.

The movable duct section is designed to move between a retracted position and an extended position, as the two terminal positions. In the retracted position, each side edge of the movable duct section is disposed adjacent a respective side edge of the cutout and the interior edge of the movable duct section is disposed adjacent the leading edge of the cutout. The leading (exterior) edge of the movable duct section is sized and shaped as the leading edge of the duct. In other words, when the movable duct section is retracted, the leading edge of the movable duct section completes the leading edge of the duct and at least the exterior surface of the movable duct section completes the exterior surface of the duct. In the extended position, the movable duct section moves away (extends) from the cutout and is disposed at a distance from the duct. In other words, in the extended position, the movable duct section is separated from the cutout and is also separated from the duct. The movable duct section traverses both inner and outer wall section of the duct. Furthermore, the profile of inner and outer surfaces of the movable duct section are complementary to and blend with the inner and outer surfaces of the duct when the movable duct section is fully retracted into the cutout. In other words, the movable duct section fuses with the duct and may be recognized only by lines representing the cutout.

The apparatus comprises an actuating device. The actuating device is coupled to a power source and to a control source. The actuating device is designed to move the movable duct section in a response to control signal(s) from the control source. The actuating device may comprise a single actuator. The single actuator is disposed in a cavity in the duct during use of the apparatus. The cavity is being disposed, in an open communication with the cutout adjacent the leading edge of the cutout and between the side edges of the cutout. The cavity may be centered relative to the leading edge.

The actuating device may comprise two actuators. Each actuator from two actuators is being disposed in a cavity in the duct during use of the apparatus. The cavity being in an open communication with the side edge of the cutout. An access panel may be provided to selectively allow access to the actuator during installation and maintenance. The access panel may be provided on the interior or exterior of the duct. Thus, when the actuating device comprises two actuators, the duct comprises two cavities.

The actuator may be provided as a rack and pinion arrangement. This arrangement comprises a rack, a pinion, the pinion being in a teeth-meshed engagement with the rack, and a drive, the drive is configured to rotate the pinion. A rotational direction of the pinion controls a movement direction of the rack.

Shape of the rack depends on the position within the duct. The rack may be straight when positioned in the cavity adjacent the leading edge of the cutout. The rack may be curved when positioned in the cavity adjacent a side edge of the cutout in order to follow a curvature of the duct. The cavity may be sized to minimize friction during movement of the rack, yet prevent binding of the rack. In other words, the cavity surface(s) can be positioned in a close proximity to the surface(s) of the rack to provide operating clearance. The rack may be adapted with one or more projections that are sized and shaped to be received within complimentary voids within the duct in order to improve guidance control of the rack movement without binding or excessive play.

The drive may be provided as an electromagnetic clutch and brake assembly. The electromagnetic clutch and brake assembly may be of a type as manufactured by any one of Bosch, AC Delco, and Magneti Marelli under various model numbers. The pinion may be coupled to an output shaft of the electromagnetic clutch and brake assembly. The pinion can be sized and shaped to encircle an exterior surface of the electromagnetic clutch and brake assembly.

The actuator may be provided as a rotary drive. The rotary drive may be of a type as used on automotive components, for example like window winders.

In operation, the rack is movable between a first position corresponding to the retracted position of the movable duct section and a second position corresponding to the extended position of the movable duct section.

The actuator may be provided as linear drive. Such linear drive may be a cylinder. The cylinder may be actuated by one of an electric, a pneumatic and a hydraulic power source.

In operation, the linear drive is operable between a retracted position corresponding to the retracted position of the movable duct section and an extended position corresponding to the extended position of the movable duct section.

The apparatus also comprises a linkage. The linkage couples, during the operation of the apparatus, the movable duct section to each of the actuator and the duct. The linkage may be designed to control radial displacement of the movable duct section relative to the exterior surface of the duct. The linkage may be designed to control axial displacement of the leading edge of the movable duct section relative to the leading edge of the duct and to the leading edge of the cutout. The linkage may be designed to control an inclination angle of the movable duct section relative to the duct. In view of the above, it will be understood that linkage controls a position and/or an orientation of the movable duct section relative to the remaining duct portion.

When the apparatus comprises a single actuator, the linkage may comprise an actuating link and three control links.

The actuating link is being connected, at one end thereof, to the actuator and is being connected, at an opposite end thereof, to the interior edge of the movable duct section. The actuating link may be in a pivoting connection with the actuator. The actuating link may be in a movable connection with the movable duct section. A slot can be provided in the interior surface of the movable duct section to receive an enlarged end of the actuating link. During the operation, the enlarged end of the actuating link moves within the slot as the movable duct section moves between the extended and retracted positions. The connection between the actuating link and the movable duct section also allows the actuating link to change orientation relative to the movable duct section during a movement thereof. In any regards, when the apparatus is controlled to extend the movable duct section, the actuating link will pull the movable duct section away from the cutout and when the apparatus is controlled to retract the movable duct section, the actuating link will push the movable duct section into the cutout.

Two control links from the three control links couple ends of the movable duct section to side edges of the cutout. Each control link from these two control links comprises a pivotal connection with the side edge of the movable duct section and both a movable and a pivotal connection with the side edge of the cutout. When the movable duct section is in the retracted position, each actuating link is disposed within a duct cavity, with the duct cavity being in an open communication with the side edge of the cutout and adjacent the leading edge of the duct. Each link can also comprise a damper. The damper is sized and shaped to fit within the cavity. During movement of the movable duct section the damper functions to dampen and smoothen possible oscillations in the operations of the apparatus.

The remaining third link from the three links couples an interior edge portion of the movable duct section to the leading edge of the cutout, mediate the side edges thereof. This remaining third link can be positioned about the center of the leading edge of the cutout. The remaining third link is mounted in each of a movable and a pivotal connection with the movable duct section and in a pivotal connection with the duct. The remaining third link can be provided as a pair of C-shaped sections that may be linked with each other at one end. To achieve each of the movable and pivotal connection, the interior surface of the movable duct section can be adapted with a slot that receives one end of the third remaining link. The other end of the third remaining link can be inserted into an opening in the duct.

When the apparatus comprises two actuators, the linkage may comprise two actuating links and one control link.

Each actuating link from the two actuating links is being coupled, at one end thereof, to a respective actuator from the two actuators and is being coupled, at an opposite end thereof, to one end of the movable duct section. As has been described above, the one end being disposed adjacent a respective side edge of the cutout when the movable duct section being in the retracted position. Each actuating link is being further coupled in a pivotal connection with the respective actuator and in a pivotal connection with the respective end of the movable duct section so that the actuating link has sufficient degrees of movement freedom when the movable duct section moves between retracted and extended positions and the actuator moves relative to a movement of the movable duct section. The pivotal connection can be provided by a spherically shaped cavity in each of the side edge of the cutout and the end of the movable duct section and an enlarged end of the actuating link, where the enlarged end can at least partially include a complimentary spherical shape.

The control link couples an interior edge portion of the movable duct section to the leading edge of the cutout, mediate the side edges thereof. The control link is mounted in each of a movable and a pivotal connection with the movable duct section and in a pivotal connection with the duct. The control link can be provided as a pair of C-shaped sections. To achieve each of the movable and pivotal connection, the interior surface of the movable duct section can be adapted with a slot that receives one end of the control link. The other end of the control link can be received within an opening in the duct.

When the apparatus comprises two actuators, the linkage may comprise two actuating links and two control links.

Each actuating link from the two actuating links is being coupled, at one end thereof, to a respective actuator from the two actuators and is being coupled, at an opposite end thereof, to one end of the movable duct section. As has been described above, the one end being disposed adjacent a respective side edge of the cutout when the movable duct section being in the retracted position. Each actuating link is being further coupled in a pivotal connection with the respective actuator and in a pivotal connection with the respective end of the movable duct section so that the actuating link has sufficient degrees of movement freedom when the movable duct section moves between retracted and extended positions and the actuator moves relative to a movement of the movable duct section. The pivotal connection can be provided by a spherically shaped cavity in each of the side edge of the cutout and the end of the movable duct section and an enlarged end of the actuating link, where the enlarged end can include a complimentary spherical shape.

Each control link from two control links couples the movable duct section, mediate ends thereof and adjacent the interior edge of the movable duct section, to the leading edge of the cutout. The control link is mounted in each of a movable and a pivotal connection with the movable duct section and in a pivotal connection with the duct. The control link can be C-shaped. To achieve each of the movable and pivotal connection, the interior surface of the movable duct section can be adapted with a slot that receives one end of the control link. The other end of the control link can be received within an opening in the duct. The slot and the opening can be referred to as link seats.

When the apparatus comprises two actuators, the linkage may comprise two actuating links and three control links.

Each actuating link from the two actuating links is being coupled, at one end thereof, to a respective actuator from the two actuators and is being coupled, at an opposite end thereof, to one end of the movable duct section. As has been described above, the one end being disposed adjacent a respective side edge of the cutout when the movable duct section being in the retracted position. Each actuating link is being further coupled in a pivotal connection with the respective actuator and in a pivotal connection with the respective end of the movable duct section so that the actuating link has sufficient degrees of movement freedom when the movable duct section moves between retracted and extended positions and the actuator moves relative to a movement of the movable duct section. The pivotal connection can be provided by a spherically shaped cavity in each of the side edge of the cutout and the end of the movable duct section and an enlarged end of the actuating link, where the enlarged end can include a complimentary spherical shape.

One control link from three control links couples a middle of an interior edge of the movable duct section to the leading edge of the cutout, mediate the side edges thereof. This control link is mounted in each of a movable and a pivotal connection with the movable duct section and in a pivotal connection with the duct. This control link can be provided as a pair of C-shaped sections. To achieve each of the movable and pivotal connection, the interior surface of the movable duct section can be adapted with a slot that receives one end of the third remaining link. The other end of the third remaining link can be inserted into an opening in the duct. The slot and the opening can be referred to as link seats.

The remaining two control links from the three control links couple the interior edge of the movable duct section to the leading edge of the cutout adjacent the side edges of the cutout. Each control link from two remaining control links is mounted in each of a movable and a pivotal connection with the movable duct section and in a pivotal connection with the duct. This control link can be C-shaped. To achieve each of the movable and pivotal connection, the interior surface of the movable duct section can be adapted with a slot that receives one end of the control link. The other end of the control link can be received within an opening in the duct. The slot and the opening can be referred to as link seats.

The apparatus may also comprise three actuators. One actuator from three actuators may comprise a linear drive as described above and being located in a cavity mediate the ends of the movable duct section. The two remaining actuators from three actuators may comprise the rotary type actuators as described above. Each actuator is connected to the movable duct section as described above. The additional control linkage may be provided on a duct that comprises a larger movable duct section, for examples comprising about a third of the duct or even a half of the duct leading edge, but may not be necessary on movable duct section of a smaller size.

The apparatus may also comprise four actuators. Two actuators from four actuators may comprise linear drives as described above and being located in cavities adjacent the ends of the movable duct section. The two remaining actuators from four actuators may comprise the rotary type actuators as described above. Each actuator is connected to the movable duct section as described above. The additional control linkage may not be necessary even on movable duct section of a larger size.

The present disclosure also teaches a duct with a hollow interior, a leading peripheral edge, a trailing peripheral edge, the trailing peripheral edge being disposed at a distance from the leading peripheral edge along a flow axis, and a cutout that includes a portion of the peripheral edge of the duct. The leading edge terminates a portion of the duct that curves outwardly from the remaining straight portion of the duct. The cutout defines two side edges. Each side edge is generally disposed in a plane being generally aligned with a direction of the flow axis. The cutout also defines a leading edge. The leading edge of the cutout is disposed in a plane being generally normal to the flow axis. The leading edge of the cutout is disposed in the portion of the duct that curves outwardly. The duct further comprises an opening within a thickness of the duct, the opening being in an open communication with the cutout. The opening can comprise two openings, each opening from two openings being in an open communication with a respective side edge of the cutout. The opening can be provided as a cavity. The duct may comprise an opening in the interior surface to access the cavity. The opening in the interior surface may be selectively opened and closed with a cover. The duct may comprise a spring-loaded projection on one or both side edges of the cutout. The spring-loaded projection is configured to move into an opening in the side edge so that the exterior surface of the projection does not protrude past a surface of the side edge.

The present disclosure also teaches a duct with a hollow interior, a leading peripheral edge, a trailing peripheral edge, the trailing peripheral edge being disposed at a distance from the leading peripheral edge along a flow axis, and a cutout that includes a portion of the peripheral edge of the duct. The cutout defines two side edges. Each side edge is generally disposed in a plane being generally aligned with a direction of the flow axis. The cutout also defines a leading edge. The leading edge of the cutout is disposed in a plane being generally normal to the flow axis. The duct further comprises an opening within a thickness of the duct, the opening being in an open communication with the cutout. The opening can comprise two openings, each opening from two openings being in an open communication with a respective side edge of the cutout. The opening can be provided as a cavity. The duct may comprise an opening in the interior surface to access the cavity. The opening in the interior surface may be selectively opened and closed with a cover. The duct may comprise a spring-loaded projection on one or both side edges of the cutout. The spring-loaded projection, as a centering and locking device, is configured to move into an opening in the side edge so that the exterior surface of the projection does not protrude past a surface of the side edge. The duct also comprises a movable duct section as described above and an apparatus, that is configured to move the movable duct section between a retracted position and an extended position, as the two terminal positions. In the retracted position, each side edge of the movable duct section is disposed adjacent a respective side edge of the cutout and the interior edge of the movable duct section is disposed adjacent the leading edge of the cutout. The exterior edge of the movable duct section is sized and shaped as the leading edge. In other words, when the movable duct section is retracted, the exterior edge of the movable duct section completes the leading edge and at least the exterior surface of the movable duct section completes the exterior surface of the duct. In the extended position, the movable duct section moves away from the cutout and is disposed at a distance from the duct at a terminal distance of the extended position. In other words, in the extended position, the movable duct section is separated from the cutout and is also separated from the duct.

The present disclosure also teaches a ducted fan propulsion. The ducted fan propulsion comprises a duct with a duct and a hollow interior. The duct defines each of a leading edge and a trailing edge of the duct. The ducted fan propulsion may comprise a single rotor being mounted within the hollow interior. The rotor comprises a propeller blade mounted for a rotation. There is also a drive assembly configured to rotate the propeller blade. The ducted fan propulsion may comprise two or more rotors being mounted within the hollow interior. The duct comprises a cutout at the leading edge. The cutout in the duct defines two side edges. Each side edge is generally disposed in a plane being generally aligned with a direction of the flow axis. The cutout also defines a leading edge. The leading edge of the cutout is disposed in a plane being generally normal to the flow axis. A movable duct section is also provided and is being shaped and sized to fit within the cutout. The movable duct section comprises two side edges that are spaced apart from each other to define a length of the movable duct section comprises. The movable duct section also comprises an exterior edge and an interior edge. The movable duct section further comprises an exterior surface and an interior surface. The interior surface is disposed at a distance from the exterior surface to define a thickness of the movable duct section. The movable duct section comprises a curved shape. The movable duct section is curved between the side edges. The movable duct section is also curved between the interior and exterior edges. The ducted fan propulsion comprises an apparatus, as described above, that is configured to move the movable duct section between a retracted position and an extended position, as the two terminal positions. In the retracted position, each side edge of the movable duct section is disposed adjacent a respective side edge of the cutout and the interior edge of the movable duct section is disposed adjacent the leading edge of the cutout. The exterior edge of the movable duct section is sized and shaped as the leading edge. In other words, when the movable duct section is retracted, the exterior edge of the movable duct section completes the leading edge and at least the exterior surface of the movable duct section completes the exterior surface of the duct. In the extended position, the movable duct section moves away from the cutout and is disposed at a distance from the duct at a terminal distance of the extended position. In other words, in the extended position, the movable duct section is separated from the cutout and is also separated from the duct.

The present disclosure also teaches a ducted fan propulsion. The ducted fan propulsion comprises a duct as described above, a movable duct section as described above, and an apparatus as described above. The ducted fan propulsion may comprise a single propeller being mounted on a hub. The ducted fan propulsion may comprise two propellers disposed next to each other along a length of the duct between the leading and trailing edges. The two propellers are mounted on the hub. Each propeller from two propellers rotates in a different direction. In other words, the two propellers are contra-rotating. The propeller(s), when rotated, generate trust in either vertical direction during takeoff and landing or in a horizontal direction during normal flight.

The ducted fan propulsion may further comprise an interlock between the movable duct section and the duct. The interlock may comprise a spring-loaded projection on one side edge of the cutout and a cavity on a corresponding end of the movable duct section. The spring-loaded projection is configured to move into an opening in the side edge so that the exterior surface of the projection does not protrude past a surface of the side edge when the movable duct section moves in a relationship to the cutout. The spring-loaded projection is configured to move outwardly from the opening and extend into the cavity when the movable duct section is retracted to close the cutout in the duct. The interlock may comprise a spring-loaded projection on each side edge of the cutout and a cavity in each end of the movable duct section. The interlock may comprise a spring-loaded projection on one side edge of the movable duct section and a cavity on a corresponding end of the cutout. The interlock may comprise a spring-loaded projection on each side edge of the movable duct section and a cavity on each end of the cutout.

In light of the above, it will be understood that the movable duct section traverses both inner and outer wall section of the duct. Furthermore, the profile of inner and outer surfaces of the movable duct section are complementary to and blend with the inner and outer surfaces of the duct when the movable duct section is fully retracted into the cutout. In other words, the movable duct section fuses with the remaining duct and can be essentially recognized only by lines representing the cutout.

The ducted fan propulsion may comprise a plurality of the above described movable duct sections, spaced apart from each other along the leading edge and a corresponding plurality of apparatuses, as described above.

Movement of the movable section is controlled by a controller. The controller can be integrated into the duct and electrically coupled to a vehicle controller. The controller can be a vehicle controller. The controller is configured to control a motion and a direction of motion of the actuator. A sensor can be mounted in a position to sense at least one of position and rate of change of the actuator and output a respective signal to the controller. The sensor is designed to confirm at least one of a position of the movable duct section, a change in position and a rate of change in position. The sensor is designed to confirm the movement as controlled from the vehicle, based on the vehicle's speed of the vehicle and angular inclination of the duct. The sensor can also help to identify any suspected or possible failure in the apparatus.

The sensor can report at least one of position and rate of change in one or more axis. The sensor can comprise a gyro. The sensor can comprise a global positioning sensing (GPS) device. More than one sensor can be used. Additional sensor can be employed to provide information on the inclination of the vehicle, G-forces acting on it, fluid flow rate change, etc. Such additional sensor may be installed on a frame of the vehicle.

When the movable duct section is moved into extended position, the leading edge of the cutout is revealed. The leading edge of the cutout is lower than the outer edge of the movable duct section and also lower than the remaining leading edge of the duct. Fluid flow first encounters the leading edge of the movable duct section, which is now slightly ahead and higher than the leading edge of the cutout. Then, the fluid flow encounters an inner surface of the movable duct section, where the inner surface extends from the leading edge of the movable duct section. Next, the fluid flow, affected by the encounters with the leading edge of the movable duct section and with inner surface of the movable duct section, now encounters the leading edge of the cutout. Due to the orientation and shape of the movable duct section, a pressure differential forms between the leading edge of the movable duct section and the leading edge of the cutout. The pressure differential improves uniformity of the fluid flow. The uniform fluid that flows from the leading edge of the movable duct section will now flow across the leading edge of the cutout and across the inner surface of the duct that extends from the leading edge of the cutout into the ducted fan inlet. The pressure difference also helps to prevent fluid flow separation at the leading edge of the duct, hence enabling a fluid flow control at the leading edge of the duct. It would be understood that prevention of the fluid flow separation means that the fluid flow continues to be attached first to the inner surface of the movable duct section and then to the inner surface of the duct, starting with the leading edge of the cutout. Since the fluid flow separation is prevented, the fluid flow occurs in a controlled manner. The fluid flow separation is most evident during pivoting of the ducted fan, when changing to forward flight after the vertical takeoff or changing from forward flight to a vertical landing. During such pivoting, the fluid flow is no longer fully parallel to a rotational axis of the propellers. The rotational axis of the propellers also defines the flow axis of the fluid. Thus, the fluid flow entering and exiting the duct is more controlled.

In light of the above, it will be understood that only a portion of the duct, incorporating the leading edge, moves in a relationship to a remaining duct. In VTOL applications, positions of this movable duct portion can be adjusted in a response to conditions encountered during transition of the craft from VTOL mode to level flight. A non-limiting example of these conditions may include a sudden gust of wind encountered in flight. This helps to deal with flow separation issues that frequently occur with duct fans during transition to level flight from VTOL mode. Once the craft has attained level flight, by a rotation of the duct to face the direction of the flight, the movable duct section of the duct retracts into cutout and blends with the duct. The movable duct section of the duct helps to modify fluid flow in only a portion of the duct, where flow separation is most intense.

In light of the above, the present disclosure teaches an inlet fluid flow conditioning system for axial flow ducted fans. During forward, level flight, the fluid flows into the duct parallel to the rotation axis of the propeller(s). This is in a zero-degree or a low angle of attack. When axial flow ducted fans, mounted vertically upwards, for example on VTOL vehicles, that are transitioning to forward flight from the hover mode, at that point, the angle of attack is around 90 degree (the inlet is approximately pointing vertically upwards, depending on the vehicle design). This is a high angle of attack. Generally, fluid flow separation issues appear in particular at the leading edge of the duct during the high angle of attack. At high velocities an at the high angle of attack, inlet flow around the leading edge of a ducted fan becomes distorted. This inlet flow distortion increases as the fluid flow continues movement through the ducted fan, especially with increasing forward travel velocity. Air flow separation occurs at inner section of the leading-edge tip while fluid flow at the trailing edge area of the ducted fan remains relatively steady. Hence mass flow on and across the plane of the propeller is unbalanced leading to force differential on the plane of the propeller. This mass flow imbalance is reflected also at the duct exit. Many of the known problems of these tilt ducted fans result from the flow distortions and the resulting mass flow imbalance.

Resulting problems that are associated with the high angle of attack (at the leading edge of the duct) may include any of violent nose-up pitching moment, vibrations, instability, unpredictability, loss of vehicle control, fluctuating and increased power requirement and increased fuel consumption.

The present disclosure also teaches a fluid flow control at the leading edge of the ducted fan propulsion, particularly during the high angle of attack. The fluid flow control comprises selectively extend and retract, with an actuator, a movable duct section to position the movable duct section relative to a cutout in the duct. The position can be defined by one or more of the axial distance, radial distance and the inclination angle relative to the remaining portion of the duct. Use of adjustable, variable length control levers enables an adjustment of the position and displacement parameters of the leading edge of the movable duct section in a response to changing or evolving environmental conditions, for example such as the sudden wind gust or sudden change of wind direction.

Position of the movable duct section, defined by one or more of the axial distance, the radial distance and the inclination angle can be adjusted in accordance to a predetermined logic. In a non-limiting example, the position and the inclination angle can be adjusted proportional to vehicle speed, either increasing during transition to a forward flight or decreasing during transition to a vertical landing. Position of the movable duct section, defined by one or more of the axial distance, the radial distance and the inclination angle can be adjusted on demand, for example in a response to environmental conditions. Use of adjustable, variable length control levers enables an adjustment of the position and displacement parameters of the leading edge of the movable duct section on demand, in a response to changing or evolving environmental conditions, for example such as the sudden wind gust or sudden change of wind direction or sudden change of wind direction.

A height difference between the leading edge of the duct and the leading edge of the cutout section has an effect on performance of the ducted fan propulsion. A small height difference may be sufficient at low speeds of the vehicle. As the vehicle speed increases, the movable duct section may need to be extended further, increasing the height difference and leading to attaining sufficient fluid flow control.

The leading edge of at least one of the movable duct section and cutout may be adapted with a curved surface. When the leading edge is curved, the fluid flow is smooth and laminar even at high vehicle speeds. Without a curved surface, the fluid flow at the leading edge may experience turbulence and fluid flow separation may occur, particularly at high speeds. The curved leading edge also assist in conditioning fluid flow in the duct, particularly before the fluid flow reaches the leading edge of the cutout.

The curvature of the leading edge of the movable duct section and/or cutout can be predetermined based on vehicle configuration and intended performance envelope.

Thus, the present disclosure improves ducted fan propulsion by improving fluid flow control during high angle of attack. Axial flow ducted fans generally function optimally when fluid flow through them is parallel to their axis of rotation of the propeller. This basically refers to operation in a zero-degree low angle of attack scenario. When they are required to operate in, for example a 90-degree high angle of attack or in most cases a deviation from the zero-degree angle of attack scenario, fluid flow separation issues arise, especially with increasing forward speed. Fluid flow at the leading-edge inlet lip generally becomes distorted and this becomes more problematic at elevated forward velocities. It has been observed that these flow distortions entrain fluid separation on the inner side of the leading-edge duct lip. This causes a fluid flow control problem of axial flow ducted fans. The present disclosure improves fluid flow control by moving the movable duct section into extended position to control fluid flow into the duct. In this extended position, where the outer edge of the movable duct section being forward of the leading edge of the duct, the outer edge of the movable duct section encounters the fluid flow first and conditions the fluid flow prior to its entry into the duct. Thus, the flow control is exercised at the leading edge of the duct and downstream or upstream from it. Once the flow control process has been executed as needed, the movable duct section is retracted back into the cutout and becomes integral with the duct. In other words, the movable duct section completes the duct when the fluid flow control is no longer needed. In this arrangement, there are no protrusions on the outer surface of the duct after fluid flow control has been executed. As such, there are no protrusions on the outer surface of the duct during level forward flight that may hinder level flight performance.

The disclosure also teaches a turbofan system for jet powered VTOL operations, that comprises an apparatus, turbofan duct and a movable duct section in front of the turbofan as described above. An aircraft equipped with a suitable number of turbofans that are in turn equipped with the movable section ducted fan system will be able to rotate these modified turbo fans such that the jet from them flows vertically downwards for vertical take-off and hover flight. Then, to transition to forward and level flight, the movable section of the outer duct is activated to exercise flow control as described above.

The present disclosure also teaches a vehicle with a frame and a ducted fan propulsion, as described above. The vehicle may be a vertical takeoff and landing (VTOL) vehicle with an axial flow ducted fan propulsion, as described above. The propeller is rotatably mounted within the duct about a longitudinal axis of the duct to force an ambient fluid therethrough from its inlet, defined by the leading edge at the upper end of the duct through its exit at the lower end of the duct, and thereby to produce an upward lift force applied to the VTOL vehicle. The leading edge being thus disposed radially to a flow axis of the axial flow ducted fan propulsion. In other words, the VTOL vehicle comprises an apparatus that is designed to move a movable duct section being disposed, in one terminal position, in a cutout in a duct at the leading edge thereof.

The disclosure also teaches a method of transitioning from a vertical take-off to a level flight as well as transitioning from the level flight to a vertical landing.

To prepare for a vertical take-off, the duct is pointed upwardly. When propulsion is actuated, propellers rotate and generate thrust. The thrust lifts the vehicle upwards due to vertical orientation of the duct. The vehicle can be in the hover mode before transitioning to level flight. The duct is pointed downwards in hover. During transition to level flight, the duct is rotated slightly forwards so that part of the thrust is directed rearwards and downwards this orientation is known as a high angle of attack since the rotational axis of the propellers is disposed generally near about 90 degrees to the fluid flow into the duct inlet. In other words, an inlet fluid flow direction is not parallel to a rotational axis of propeller(s). To transition to the level flight in a forward direction from the hover mode, the vehicle operator uses vehicle controls to cause the duct to begin pivoting from facing vertically upwards to being inclined forwards thereby directing a part of the thrust from the duct partly rearwards which gives the vehicle a forward motion. When the duct pivoting motion is completed, the rotational axis of the propellers is disposed at about zero degrees to the fluid flow. This this orientation is known as a low angle of attack.

As the pivoting motion begins and forward speed increases to a set point, the vehicle control system is designed to operate the above described apparatus and move the movable duct section from the retracted position toward the extended position. During this movement, the movable duct section moves a radial distance, an axial distance and inclines at the inclination angle as described above. To move the movable duct section, actuator(s) is(are) controlled to move so that the actuating linkage pushes the movable duct section away from the cutout. Prior to actuator control, the control system may release the interlock in order to enable movement of the movable duct section.

The movable duct section remains in an the extended (activated) position until the duct almost completely rotates to the horizontal position. At this point, the control system is designed to instruct the above described apparatus to retract the movable duct section into cutout. After retraction, the control system may actuate the interlock in order to prevent undesirable movement of the movable duct section.

For vertical landing of the vehicle, the method, as described above, is reversed.

Now in a further reference to the Figures.

FIG. 1 illustrates an exploded perspective view of an apparatus 10 designed to move a movable duct section. The apparatus 10 comprises an actuator 20. The actuator 20 is being illustrated as comprising a rack 22 and a pinion 24. The pinion 24 is illustrated as enveloping a drive 30. The linkage 40 comprises one link 50, two links 60 and one link 80. The link 50 is connected to the rack 22 with a pivotal connection 52. The pivotal connection 52 may be a protrusion on the actuating link 50 received within a cavity within the rack 22. The pivotal connection 52 may be a cavity within the actuating link 50 receiving a protrusion on the rack 22. The pivotal connection 52 may be a protrusion on the actuating link 50 operatively mating with a complimentary protrusion on the rack 22. The apparatus 10 is being further illustrated as comprising a linkage 40. Each link 60 comprises an elongated member 62 with two ends 64 and 66. The elongated member 62 can be curved. The ends 64 and 66 are being illustrated as having a generally spherical shape. The link 60 is being also illustrated with a damper 70. The link 80 is coupled to the link 50 and is being illustrated as two C-sections coupled to each other at one end. As has been described above, each link 60 will connect the movable duct section to one end of the cutout and the link 80 will connect inner edge of the movable duct section to the leading edge of the cutout. As it has been further described above, link 80 actuates a movement of the movable duct section and links 60 control the movement.

Figure 2:
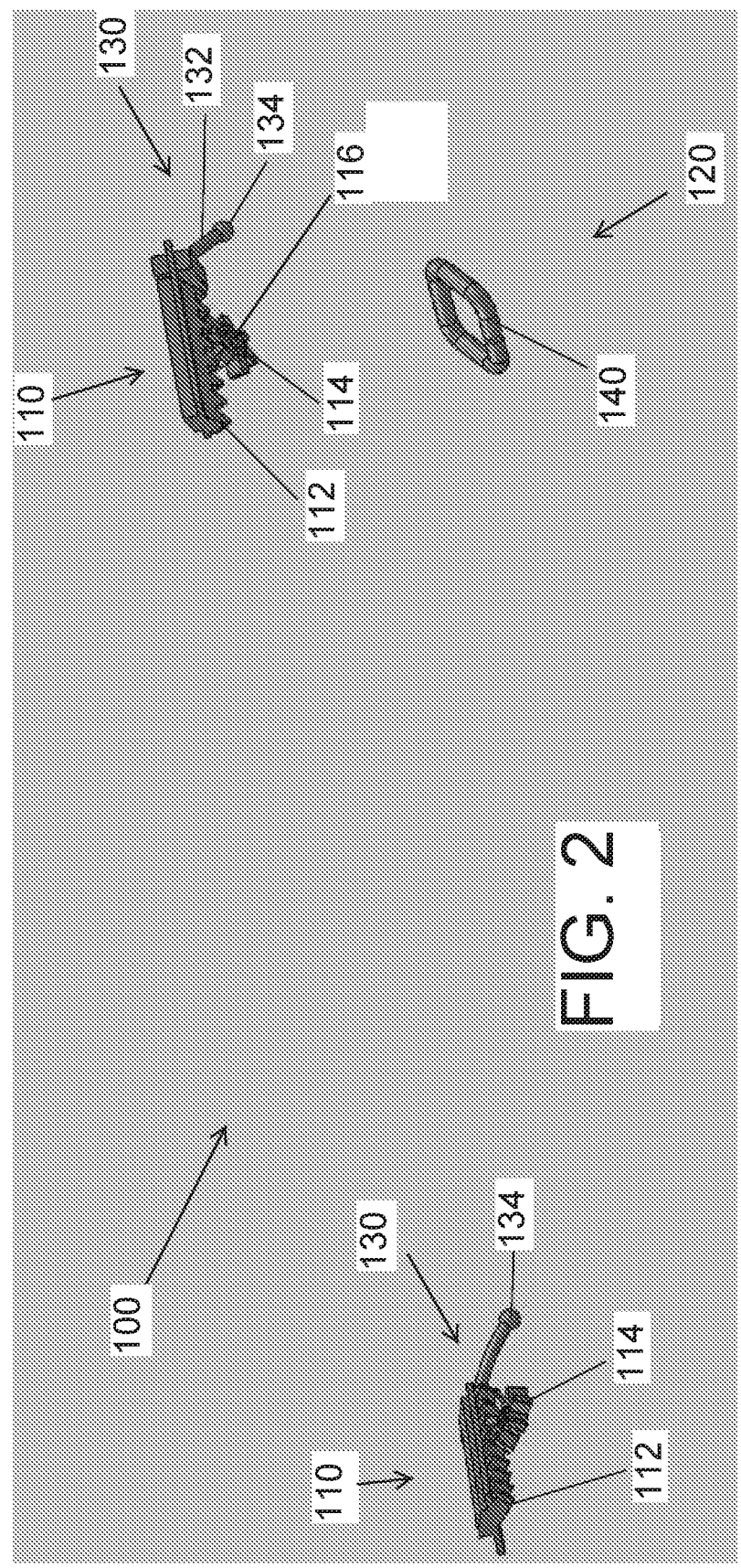
FIG. 2 illustrates an exploded perspective view of an apparatus designed to move a movable duct section.

FIG. 2 illustrates an exploded perspective view of an apparatus 100 designed to move a movable duct section. The apparatus 100 comprises two actuators 110. Each actuator 110 is being illustrated as comprising a curved rack 112 and a pinion 114. The pinion 114 is illustrated as enveloping a drive 116. The apparatus 100 is being further illustrated as comprising a linkage 120. The linkage 120 comprises two links 130 and one link 140. The link 130 is connected to the rack 112. The link 130 comprises an elongated member 132 with two ends, where one end 134 is shown. The elongated member 132 can be curved. The end 134 is being illustrated as having a generally spherical shape. The link 140 connects the movable duct section with the leading edge of the cutout. The link 130 may be referred to as an actuating link and the link 140 may be referred to as a control link.

Figure 3:
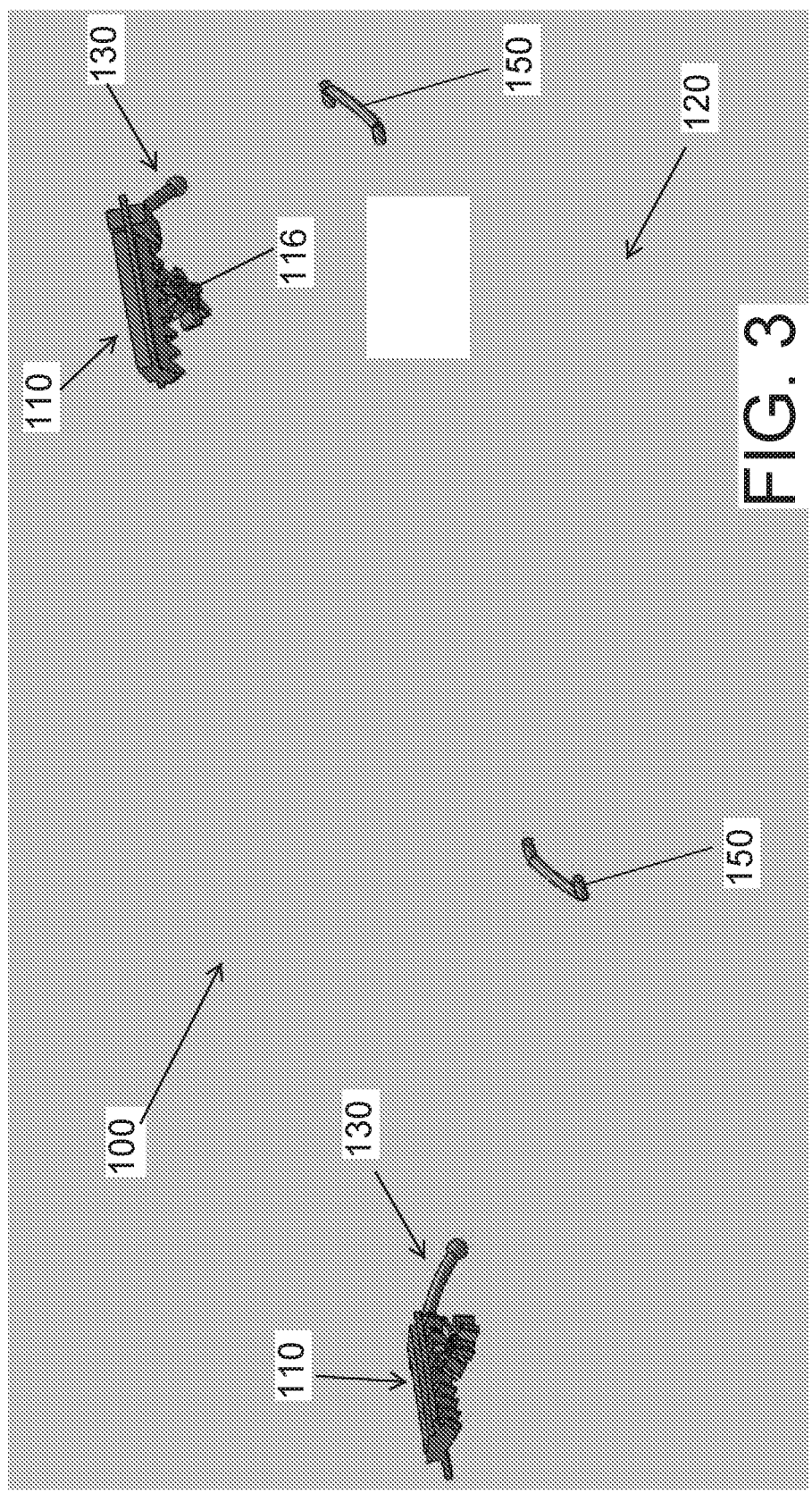
FIG. 3 illustrates an exploded perspective view of an apparatus designed to move a movable duct section.

FIG. 3 illustrates an exploded perspective view of an apparatus 100 designed to move a movable duct section. The apparatus 100 comprises two actuators 110 as described above. The linkage 120 is being illustrated as comprising the two links 130, as described above and two links 150. Each link 150 is being illustrated as comprising a C-shape configuration. The links 150 connect the movable duct section with the leading edge of the cutout. The link 130 may be referred to as an actuating link and the link 150 may be referred to as a control link.

Figure 4:
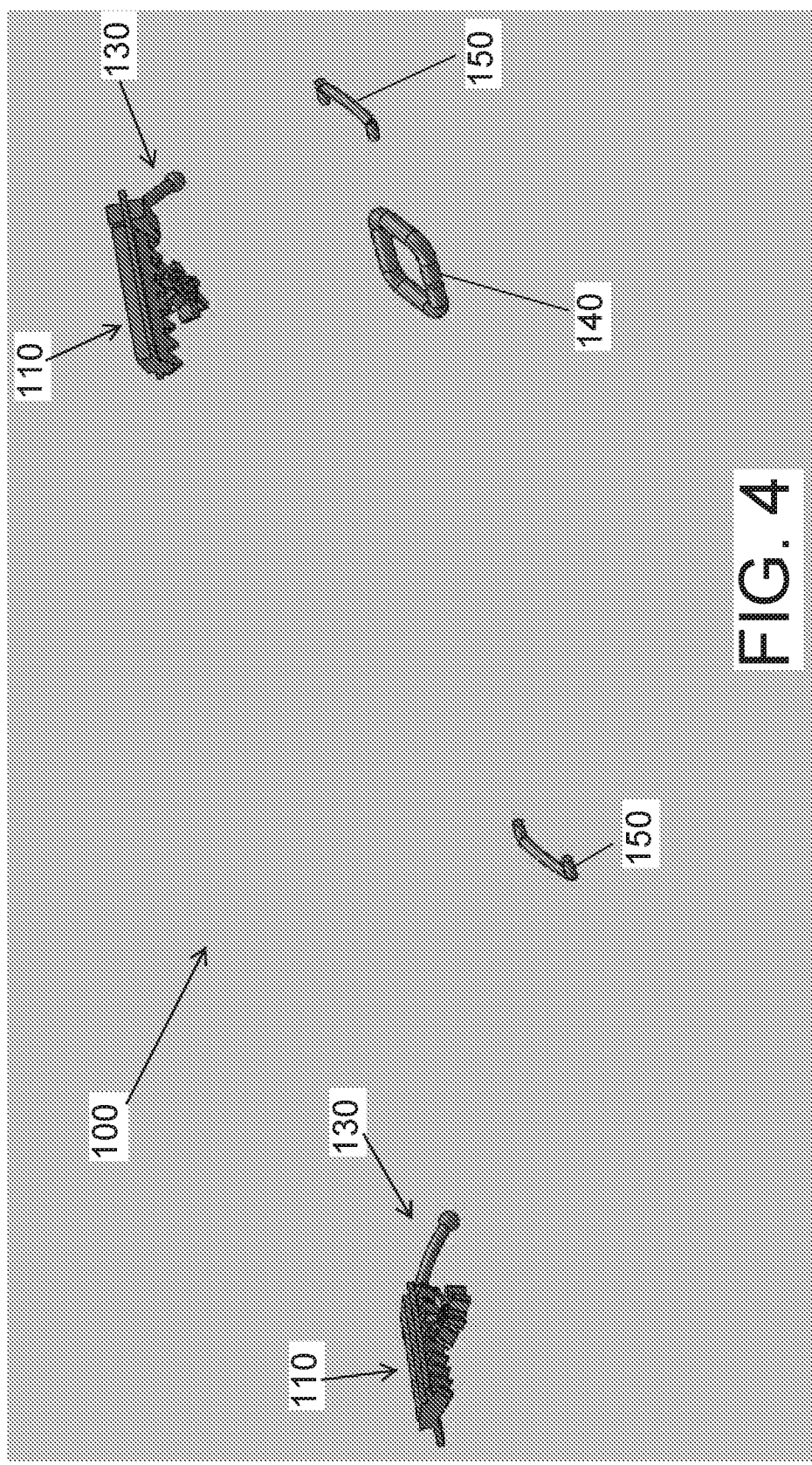
FIG. 4 illustrates an exploded perspective view of an apparatus designed to move a movable duct section.

FIG. 4 illustrates an exploded perspective view of an apparatus 100 designed to move a movable duct section. The apparatus 100 comprises two actuators 110 as described above. The linkage 120 is being illustrated as comprising two links 130, one link 140 and two links 150 as described above.

Figure 5:
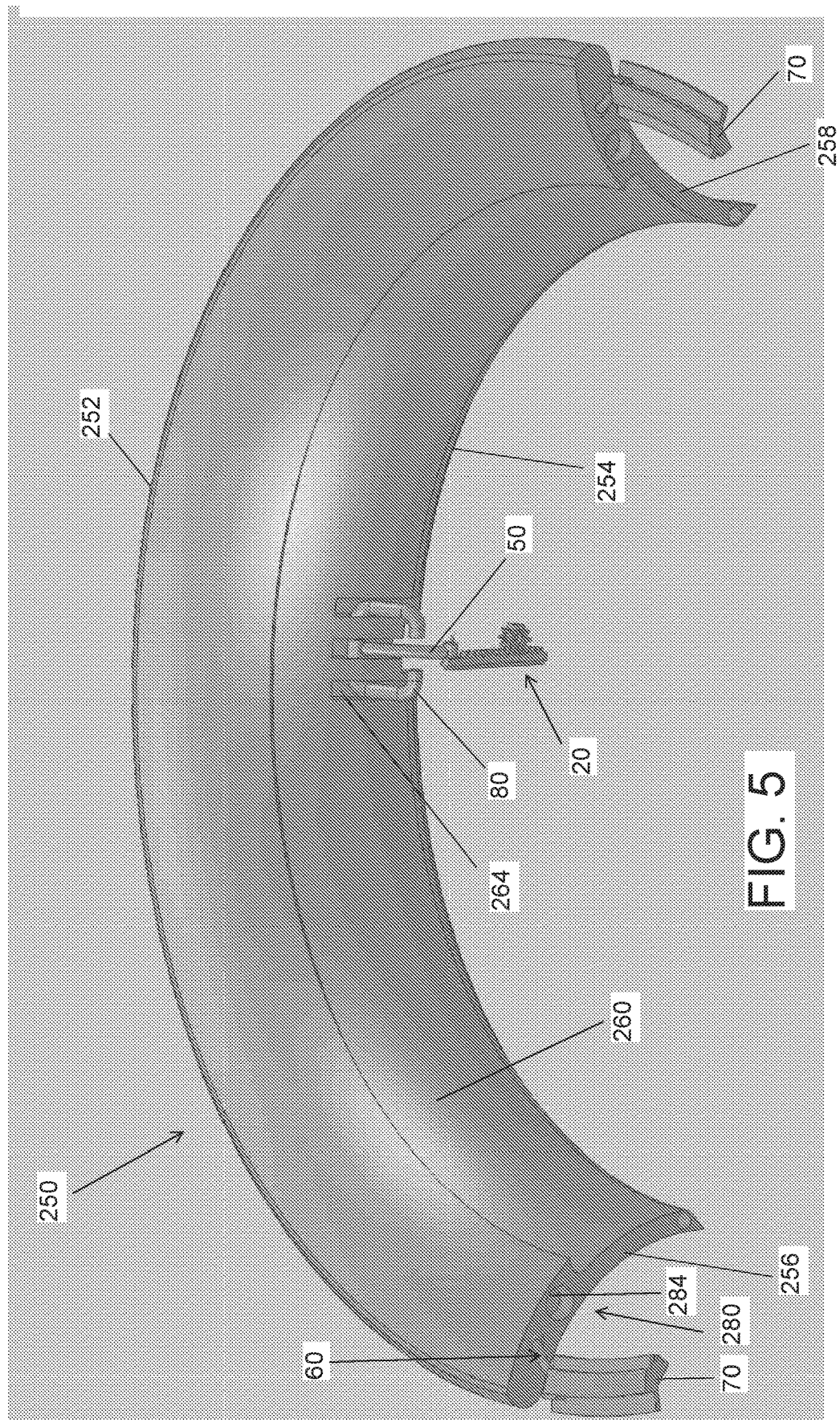
FIG. 5 illustrates an interior perspective view of the movable section with the apparatus of FIG. 1.
Figure 10:
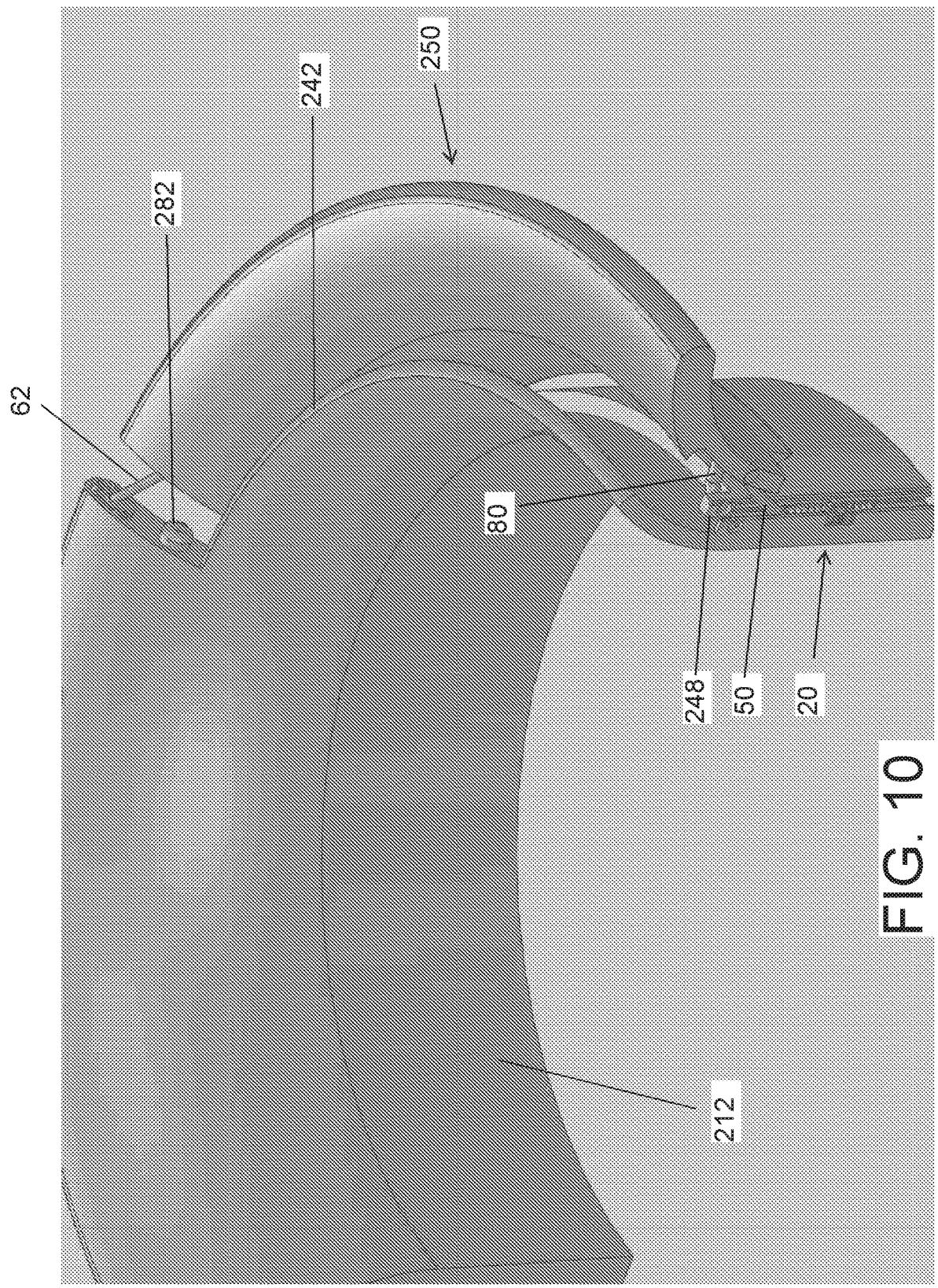
FIG. 10 illustrates a sectioned partial perspective view of the ducted fan propulsion of FIG. 7 with a movable section of FIG. 5 being in an extended position.

FIG. 5 illustrates an interior perspective view of the movable duct section 250. The movable duct section 250 is curved. The movable duct section 250 comprises a leading edge 252, an interior edge 254 and two ends 256 and 258. The movable duct section 250 also comprises an interior surface 260 and an exterior surface 262. For the sake of readers convenience, FIG. 5 also illustrates the apparatus 10 of FIG. 1 in a combination with the movable duct section 250. The link 80 is received within the link seat 264, being represented by a cutout in the interior surface 260 of the movable duct section 250. The link 80 is pivotally connected with the movable duct section 250. FIG. 5 additionally illustrates the interlock 280 that comprises a cavity 284 in the end 256, with the cavity 284 being sized and shaped to receive a projection 282 (FIG. 10).

Figure 6:
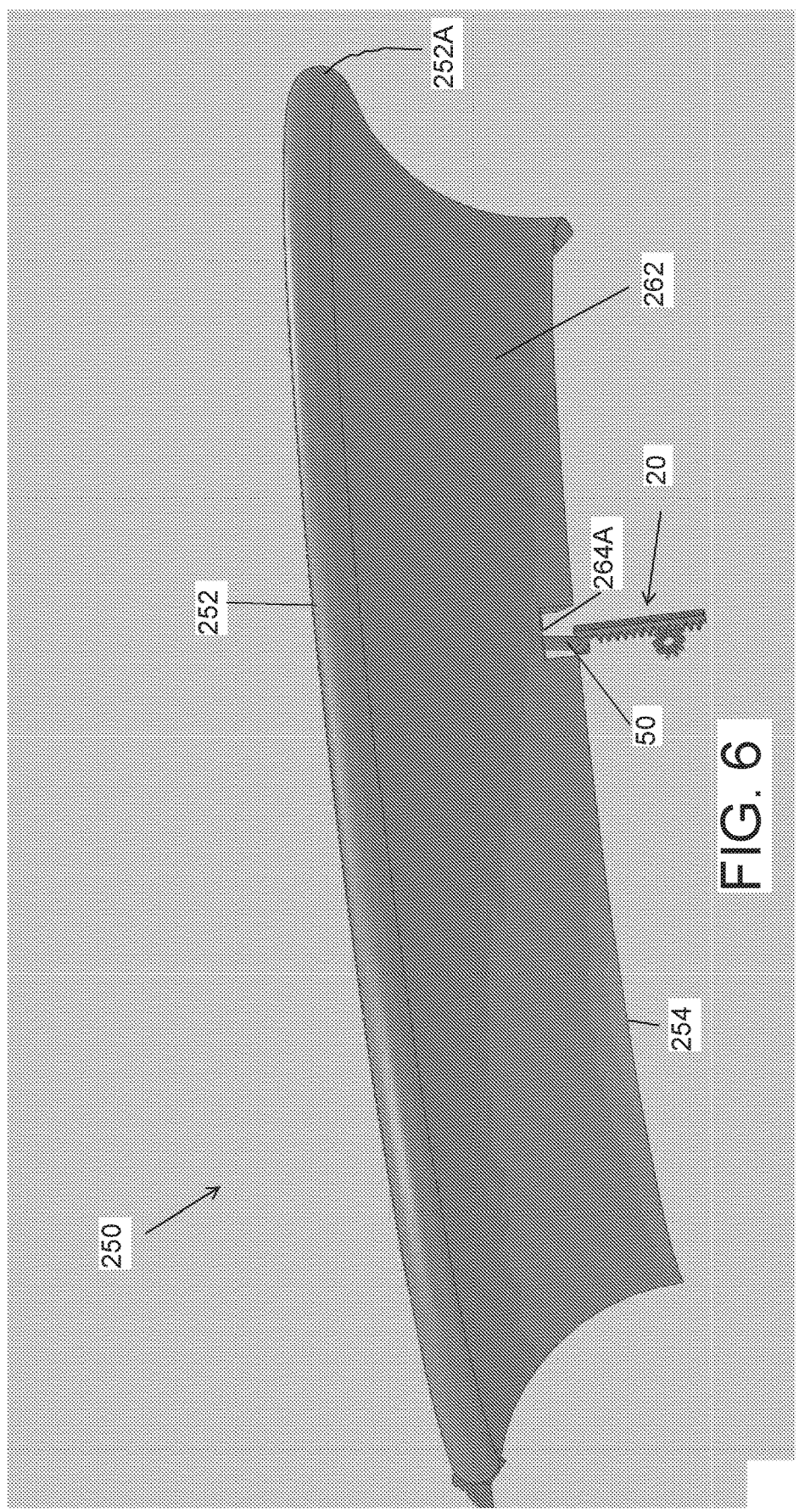
FIG. 6 illustrates an exterior perspective view of the movable section of FIG. 5.

FIG. 6 illustrates an exterior perspective view of the movable duct section of FIG. 5. FIG. 6 also illustrates a through cutout 264A in an open communication with the interior edge 254.

Figure 7:
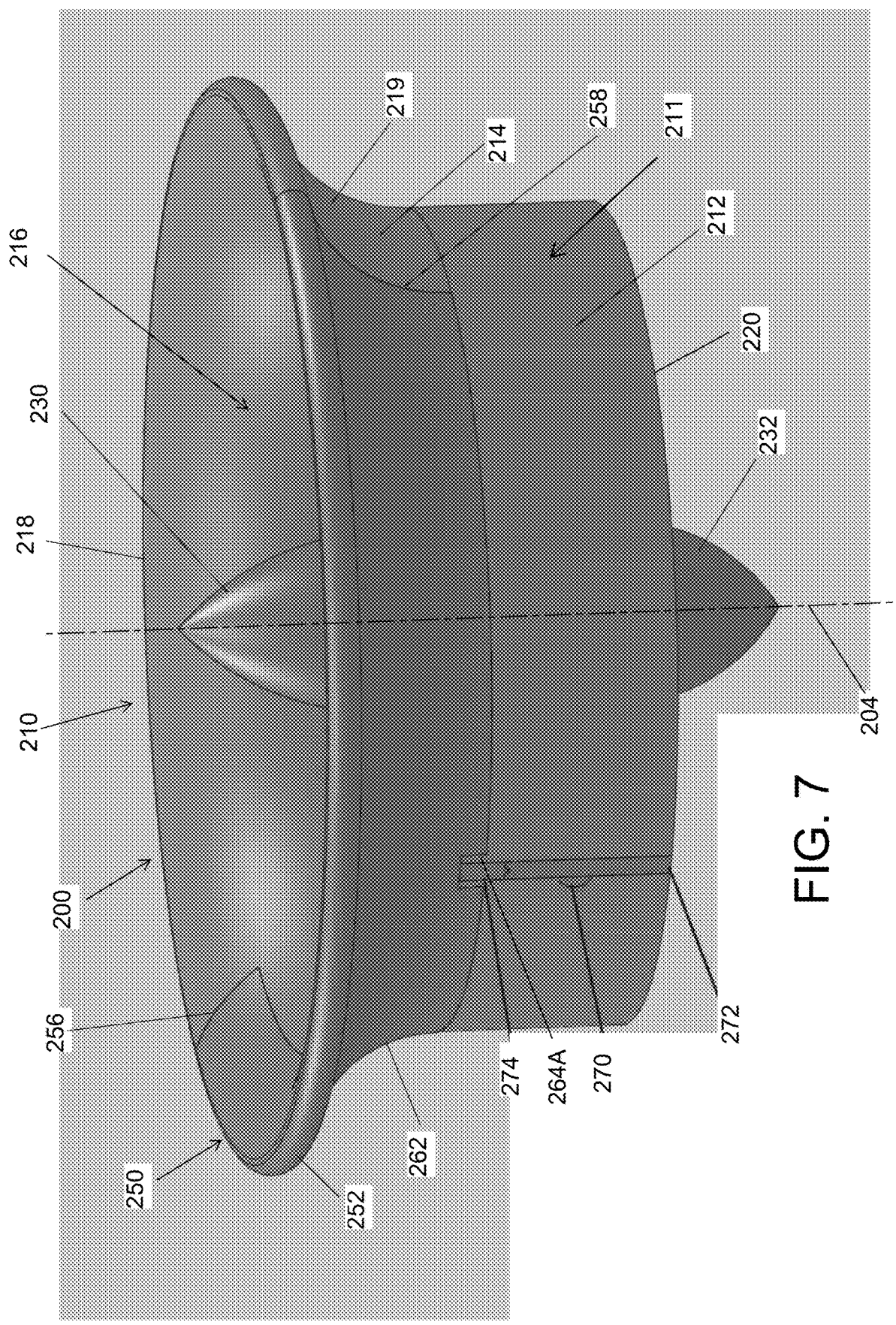
FIG. 7 illustrates a perspective view of a ducted fan propulsion with a movable section of FIG. 5 being in a retracted position as integral part of the duct fan.

FIG. 7 illustrates a perspective view of a ducted fan propulsion 200 with the movable duct section of FIG. 5, as described above, being in a retracted position. The ducted fan propulsion 200 comprises a duct 210 with a housing 211 with a hollow interior 216. The housing 211 defines a flow axis 204 between the leading edge 218 and the discharge edge 220. The ducted fan propulsion 200 also comprises an inlet cone 230 to smoothen in-flow as well as outlet cone 232 to smoothen out-flow and as well as inlet cone 230 to guide in-flow as well as outlet cone 232 to smoothen out-flow an exterior surface with a lower portion 212 and a curved portion 214. Two propeller assemblies 233 and 234, best shown in FIG. 16 below, are mounted for a rotation within the hollow interior 216 of the duct 210 between the inlet cone 230 and the outlet cone 232. The propellers are driven by a drive assembly. The duct 210 comprises a leading edge 218 and discharge edge 220 that is spaced apart from the leading edge 218 along a fluid flow axis. The leading edge 218 defines an inlet of the duct 210 and the discharge edge 220 defines an outlet of the duct 210. FIG. 7 illustrates that when the movable duct section 250 is in the retracted position, the leading edge 252 completes the leading edge 218. FIG. 7 further illustrates detachable covers 270, 272 and 274 that provide access to the actuator 20 and keeps out dust and foreign bodies. The discharge edge 220 can be also referred to as a trailing edge.

Figure 8:
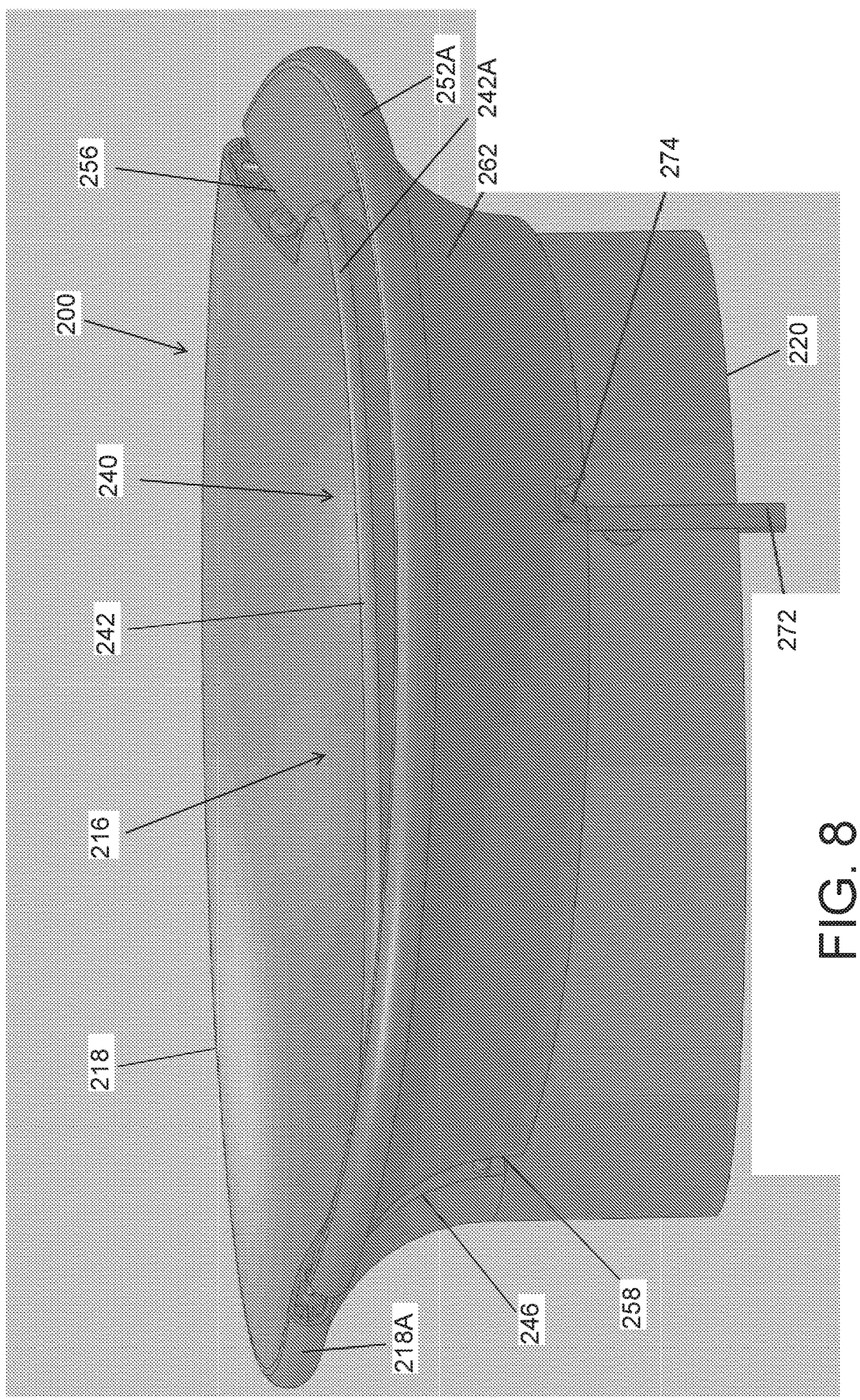
FIG. 8 illustrates a perspective view of the ducted fan propulsion of FIG. 7 with a movable section of FIG. 5 being in an extended position.

FIG. 8 illustrates a perspective view of the ducted fan propulsion 200 with the movable duct section 250, as described above, being in an extended position, exposing a leading edge 242 and a side edge 246 of a cutout 240. FIG. 8 also illustrates that the cover 274 pivoted within the cutout 264A and that the cover 272 moved outwardly from the discharge edge 220 when the 250 is activated. FIG. 8 additionally illustrates curved surface 218A of the leading edge 218, curved surface 242A of the leading edge 242 and the curved surface 252A, with a radius of curvature, of the leading edge 252, as described above. The radius of the curvature of the curved surface 252A of the leading edge 252 of the movable duct section 250 may have a significant effect on the flow of fluid at the inlet into the duct 210 and into the hollow interior 216 because the leading edge 252 helps to condition the flow, before the flow reaches the leading edge 242.

Figure 9:
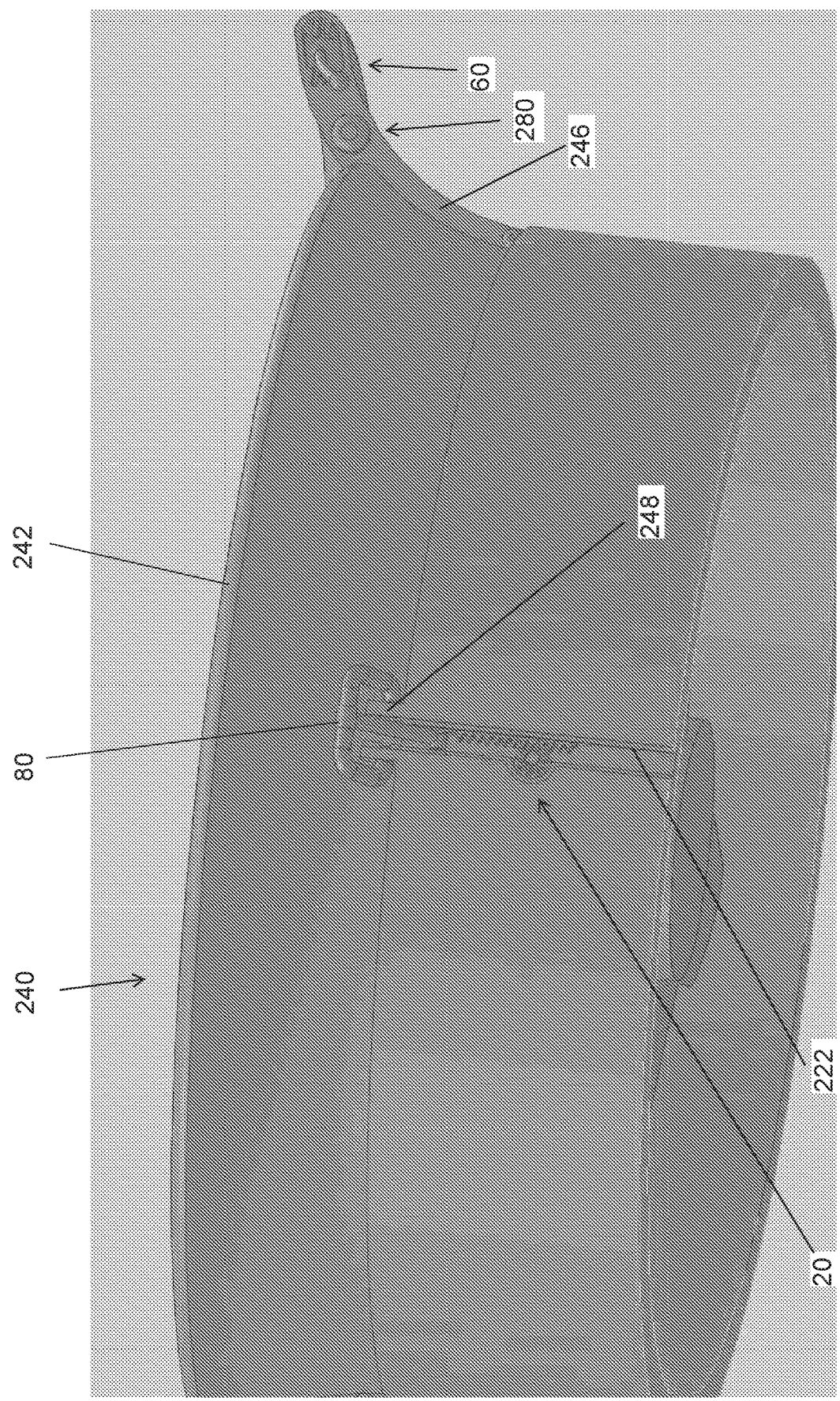
FIG. 9 illustrates a partial perspective view of the duct employed within the ducted fan propulsion of FIG. 7 with a movable duct section being removed for clarity.

FIG. 9 illustrates a partial perspective view of the duct employed within the ducted fan propulsion 200 with a movable duct section 250 and actuator covers 270, 272 and 274 being removed for clarity to expose the actuator 20 mounted within the cavity 222 in the duct 210 and further expose a pivotal connection between the link 80 and the link seats 248 within the cutout 240. The cavity 222 may be referred to as a second cavity.

FIG. 10 illustrates a partial perspective view of the ducted fan propulsion 200 with a movable duct section 250 being in an extended position and with the inlet and outlet cones 230 and 232 being removed.

FIGS. 9 and 10 also illustrate the interlock 280 comprising the projection 282 on the side edge 246 of the cutout 240.

Figure 11:
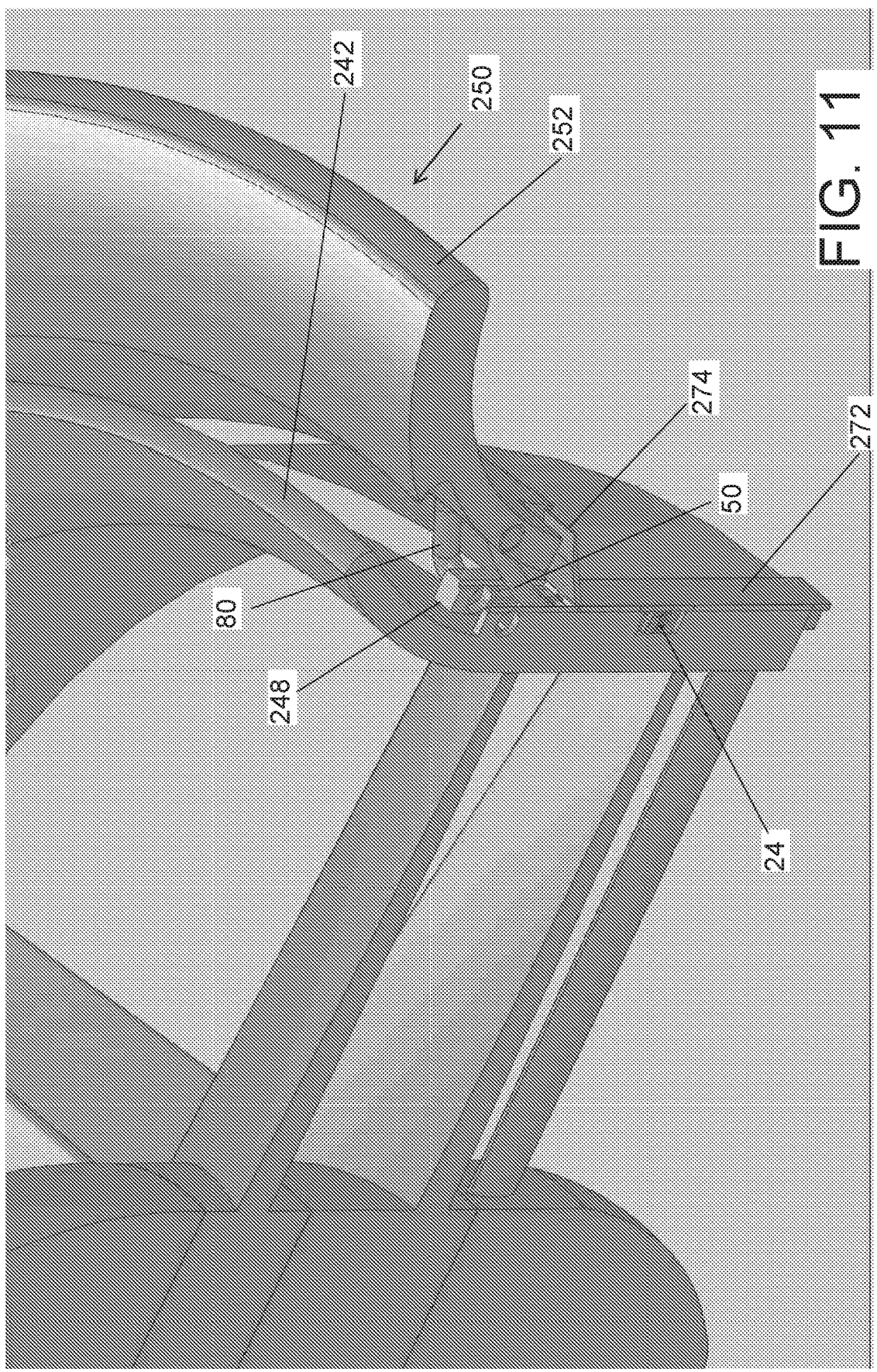
FIG. 11 illustrates a sectioned partial enlarged perspective view of the ducted fan propulsion of FIG. 10.

FIG. 11 illustrates a partial enlarged perspective view of the ducted fan propulsion 200 of FIG. 10 with the movable duct section 250 being in an extended position. The cover 274 pivots when the movable duct section 250 extends outwardly.

Figure 12:
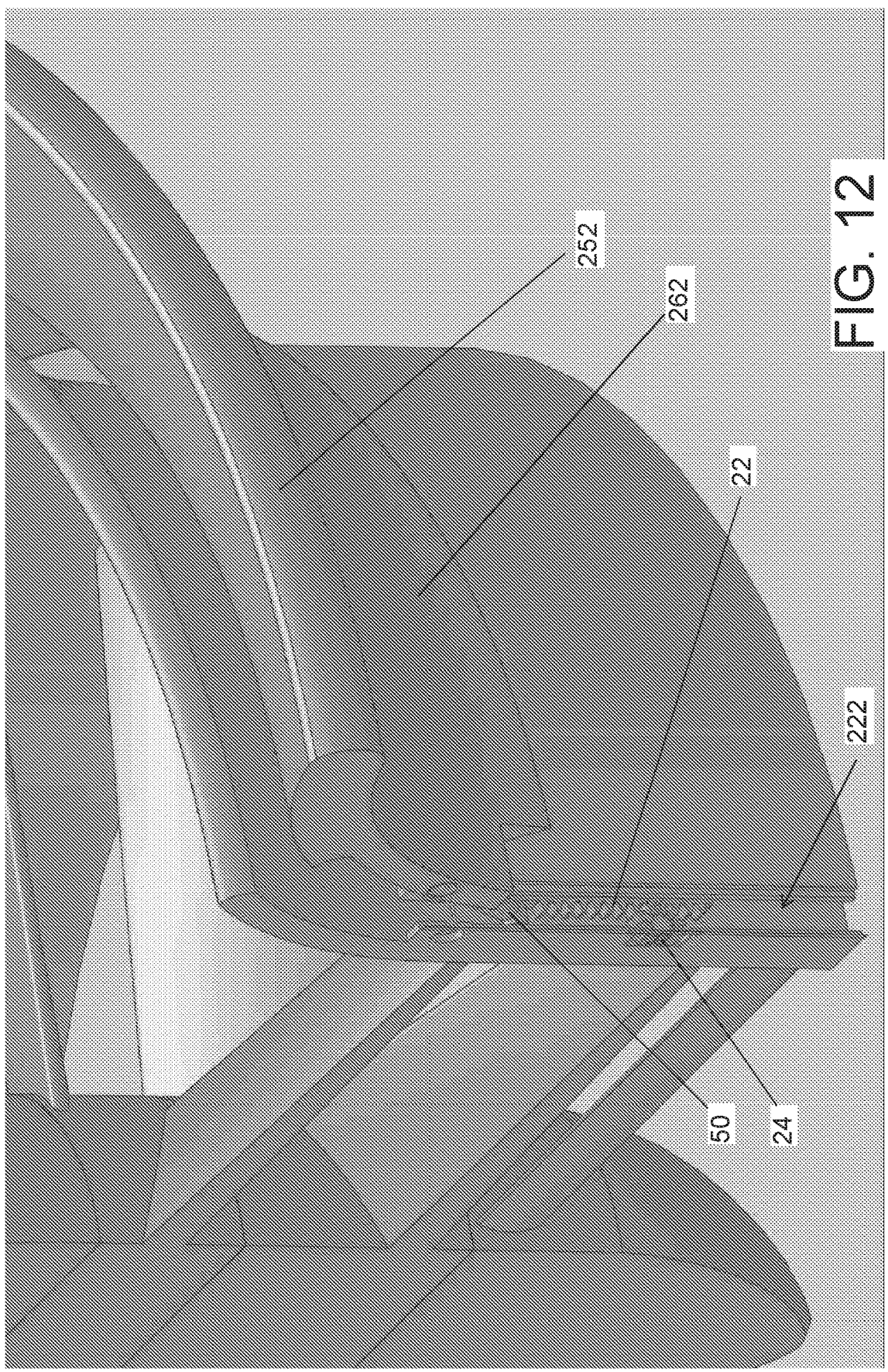
FIG. 12 illustrates a sectioned partial enlarged perspective view of the ducted fan propulsion of FIG. 10.

FIG. 12 illustrates another partial enlarged perspective view of the ducted fan propulsion 200 of FIG. 10 with the covers 272 and 274 being removed.

Figure 13:
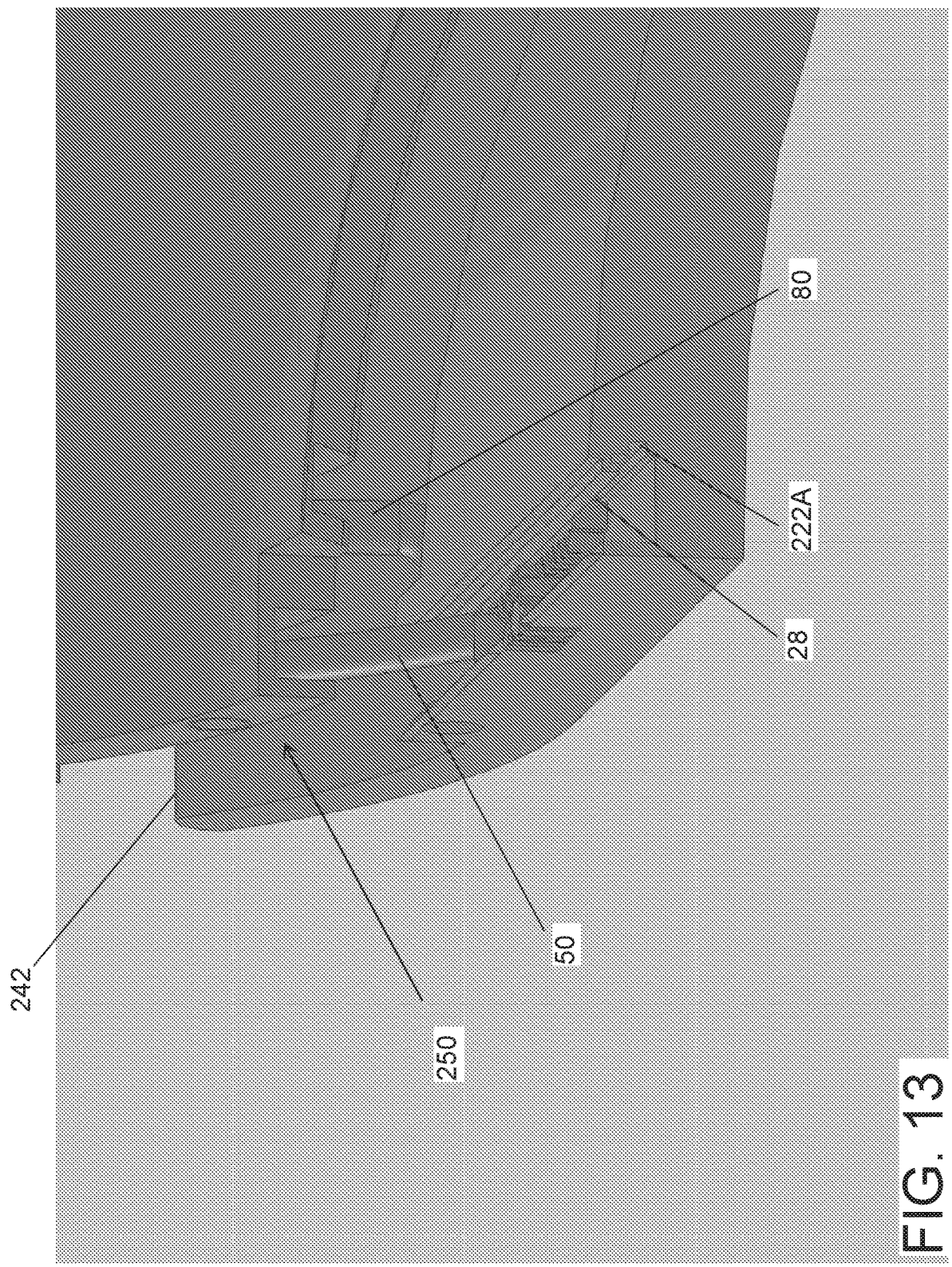
FIG. 13 illustrates a sectioned partial enlarged perspective view of the ducted fan propulsion of FIG. 10 from the discharge end of the ducted fan.

FIG. 13 illustrates a partial enlarged perspective view from the discharge end, of the ducted fan propulsion 200 of FIG. 10 with the covers 272 and 274 being removed. FIG. 13 further illustrates that the cavity 222 may be adapted with another cavity 222A to receive a protrusion 28 on the rack 22 for guiding purposes during movement of the movable duct section 250.

Figure 14:
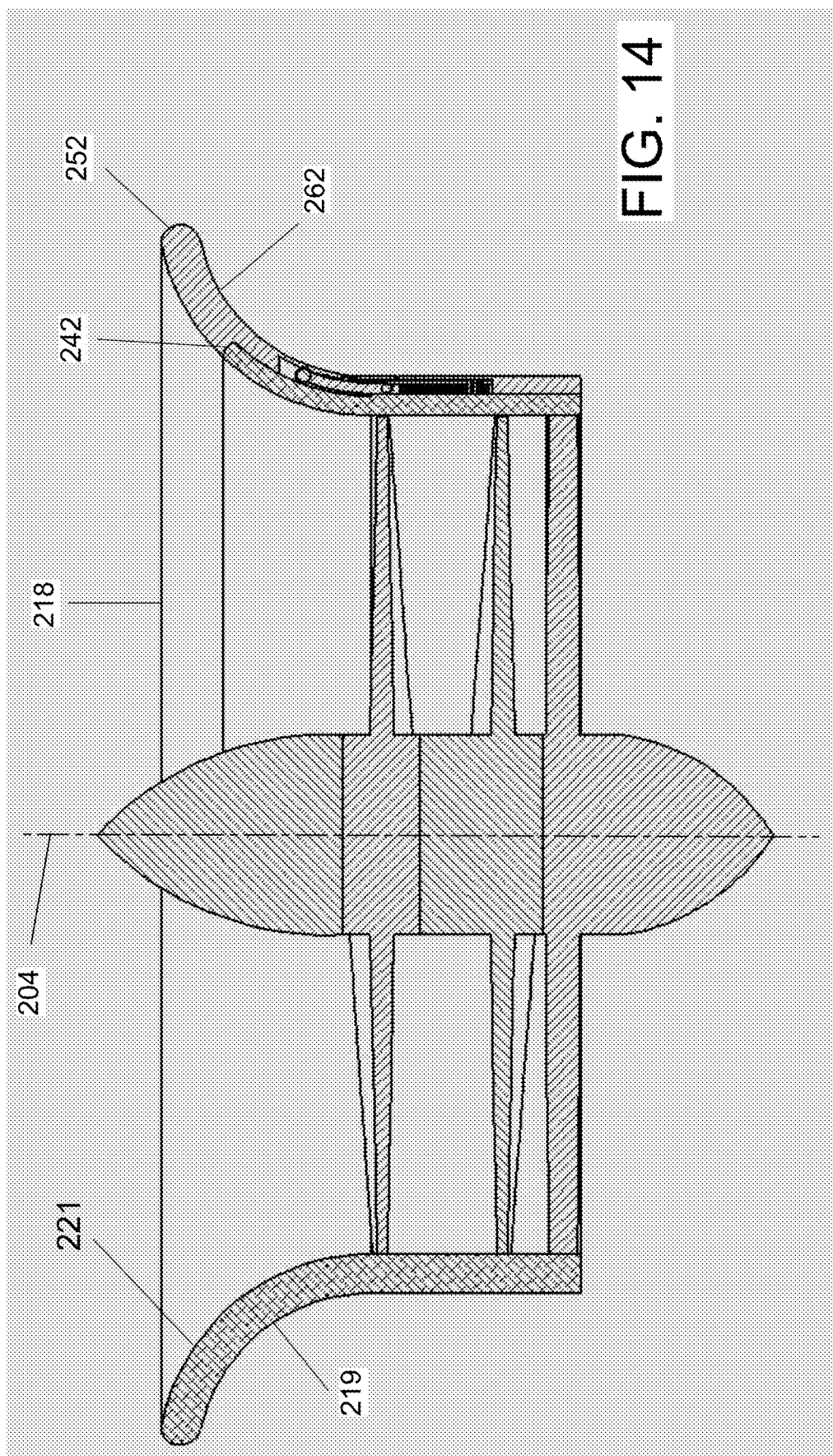
FIG. 14 illustrates a cross-sectional elevation view of the ducted fan propulsion of FIG. 7 with a movable section of FIG. 5 being in a retracted position.

FIG. 14 illustrates a cross-sectional elevation view of the ducted fan propulsion 200 with a movable duct section 250 being in a retracted position. The leading edge 252 becomes a continuation of the leading edge 218 and the exterior surface 262 becomes a continuation of the exterior surface 219 of the duct 210. Interior surface 221 of the duct 210 is also illustrated.

Figure 15:
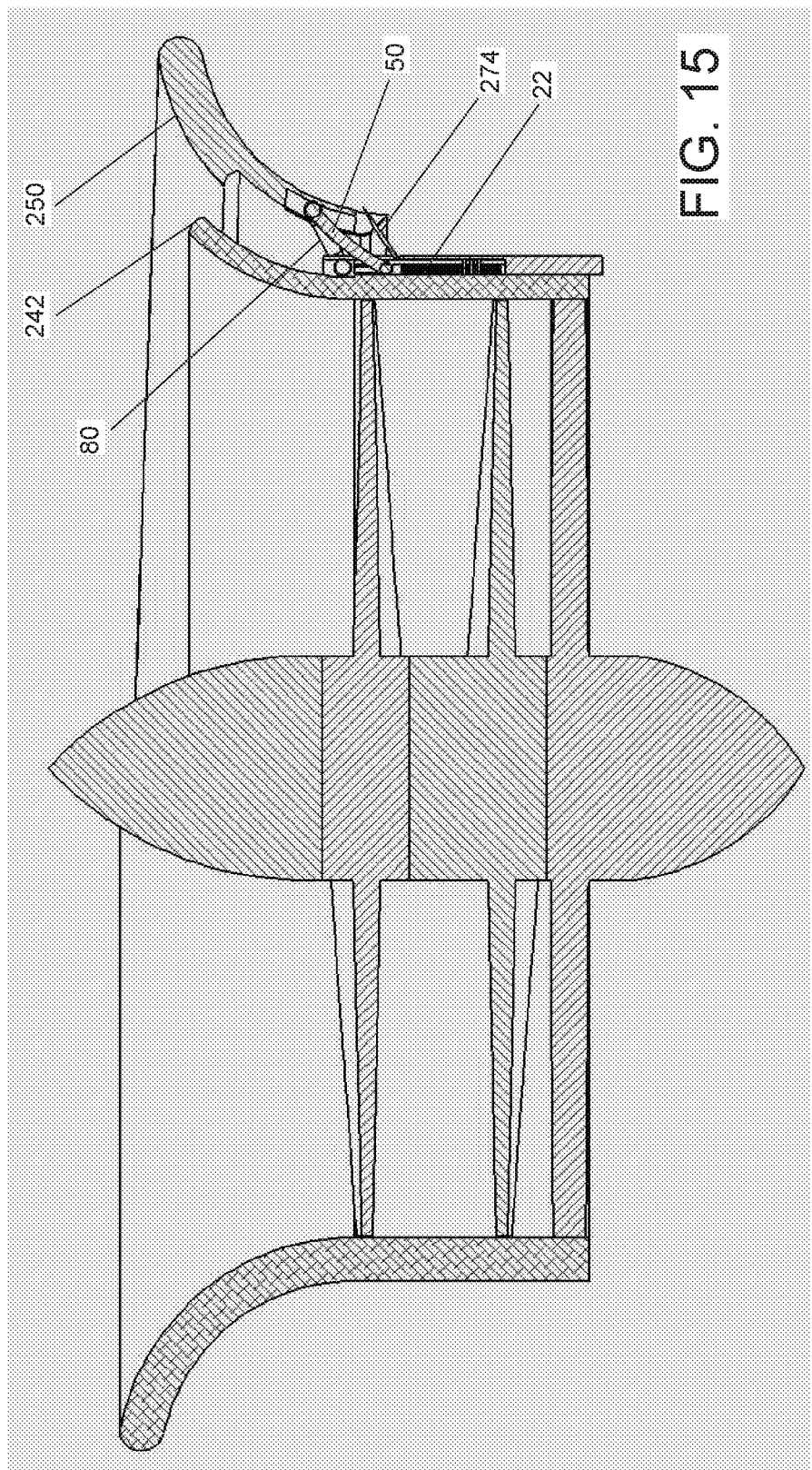
FIG. 15 illustrates a cross-sectional elevation view of the ducted fan propulsion of FIG. 7 with a movable section of FIG. 5 being in an extended position.

FIG. 15 illustrates a cross-sectional elevation view of the ducted fan propulsion 200 with the movable duct section 250 being in an extended position. It can be considered that the movable duct section 250 is being illustrated in a partially extended position in FIG. 15.

Figure 16:
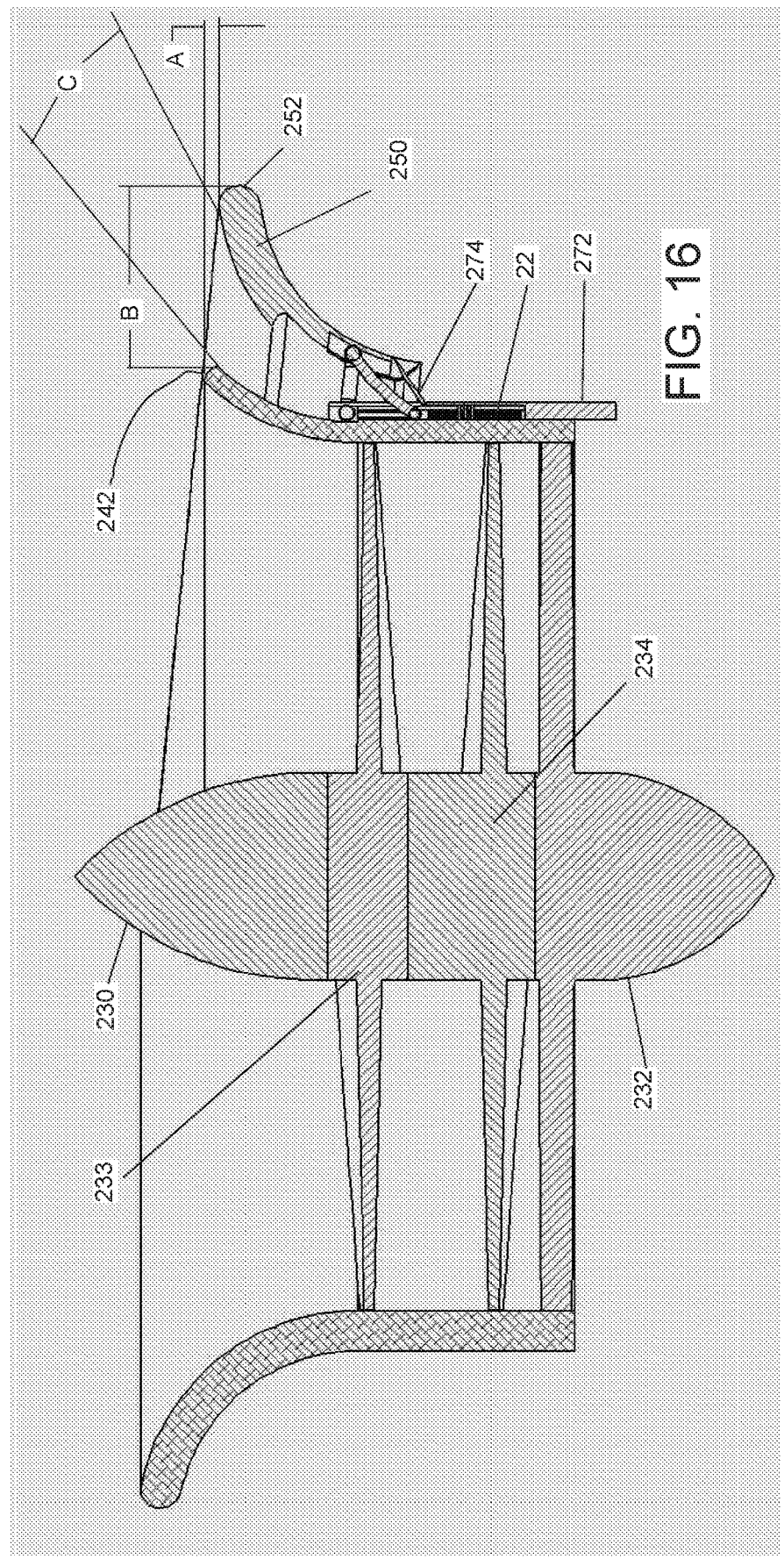
FIG. 16 illustrates a cross-sectional elevation view of the ducted fan propulsion of FIG. 7 with a movable section of FIG. 5 being in an extended position.

FIG. 16 illustrates a cross-sectional elevation view of the ducted fan propulsion 200 with the movable duct section 250 being in an extended position. It can be considered that the movable duct section 250 is being illustrated in a fully extended position in FIG. 15. FIG. 16 also illustrates that the leading edge 252 is disposed lower relative to the leading edge 242 at an axial distance A. FIG. 16 also illustrates that the leading edge 252 is disposed outwardly relative to the leading edge 242 at a radial distance B. FIG. 16 additionally illustrates that the movable duct section 250 is angled relative to the cutout 240 by an inclination angle C. FIGS. 14-16 also illustrates as the movable duct section moves between retracted and extended positions, the rack 22 slides down within the cavity 222 as well as the cover 272 moves while cover 274 pivots.

Figure 17:
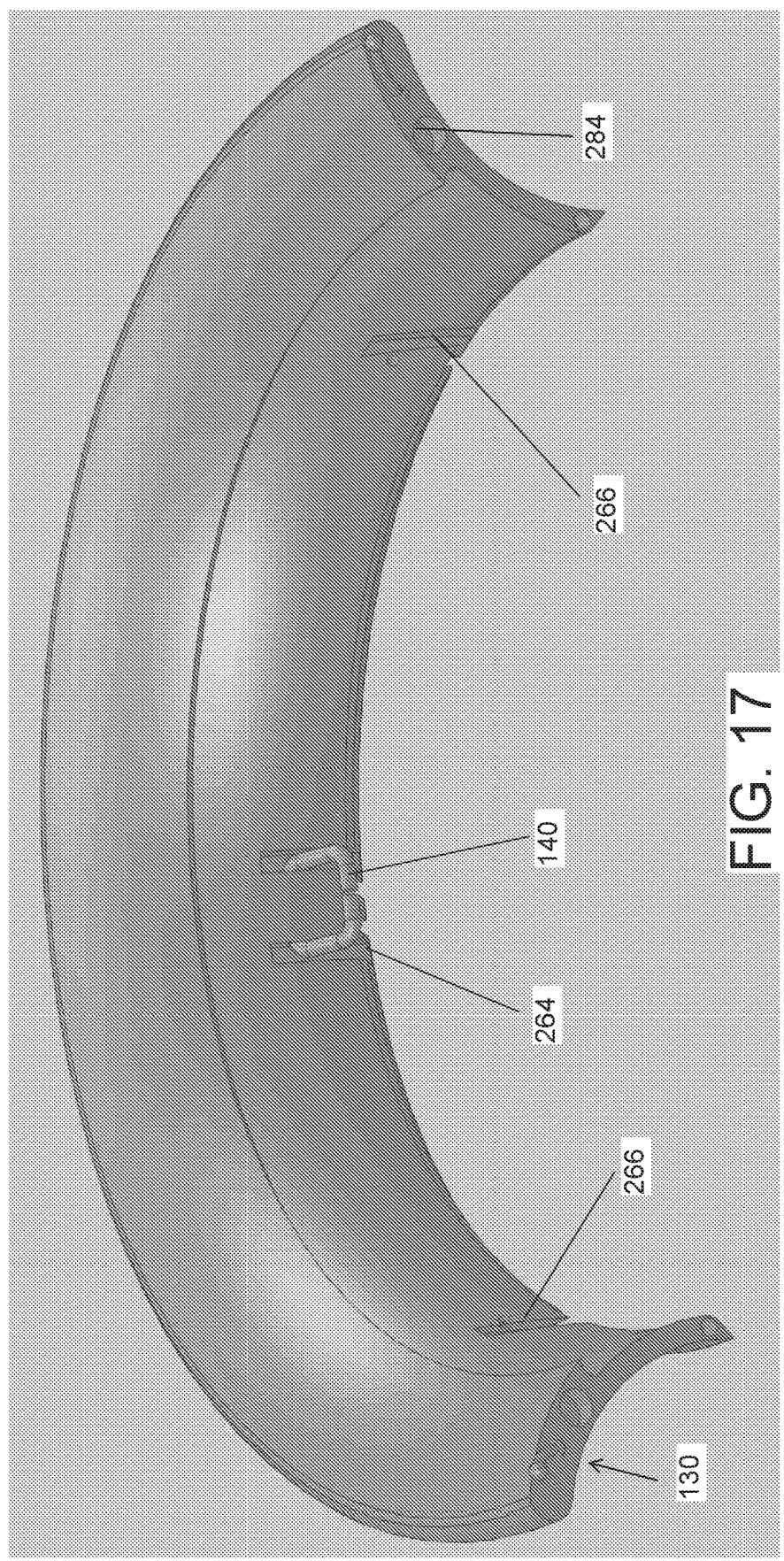
FIG. 17 illustrates an interior perspective view of the movable section with the apparatus of FIG. 2.

FIG. 17 illustrates an interior perspective view of the movable duct section 250 adapted to be used with the apparatus 100 of FIG. 2, being represented by the links 130 and 140. FIG. 17 also illustrates a cavity 284 sized and shaped to receive the projection 282 of the interlock 280.

Figure 18:
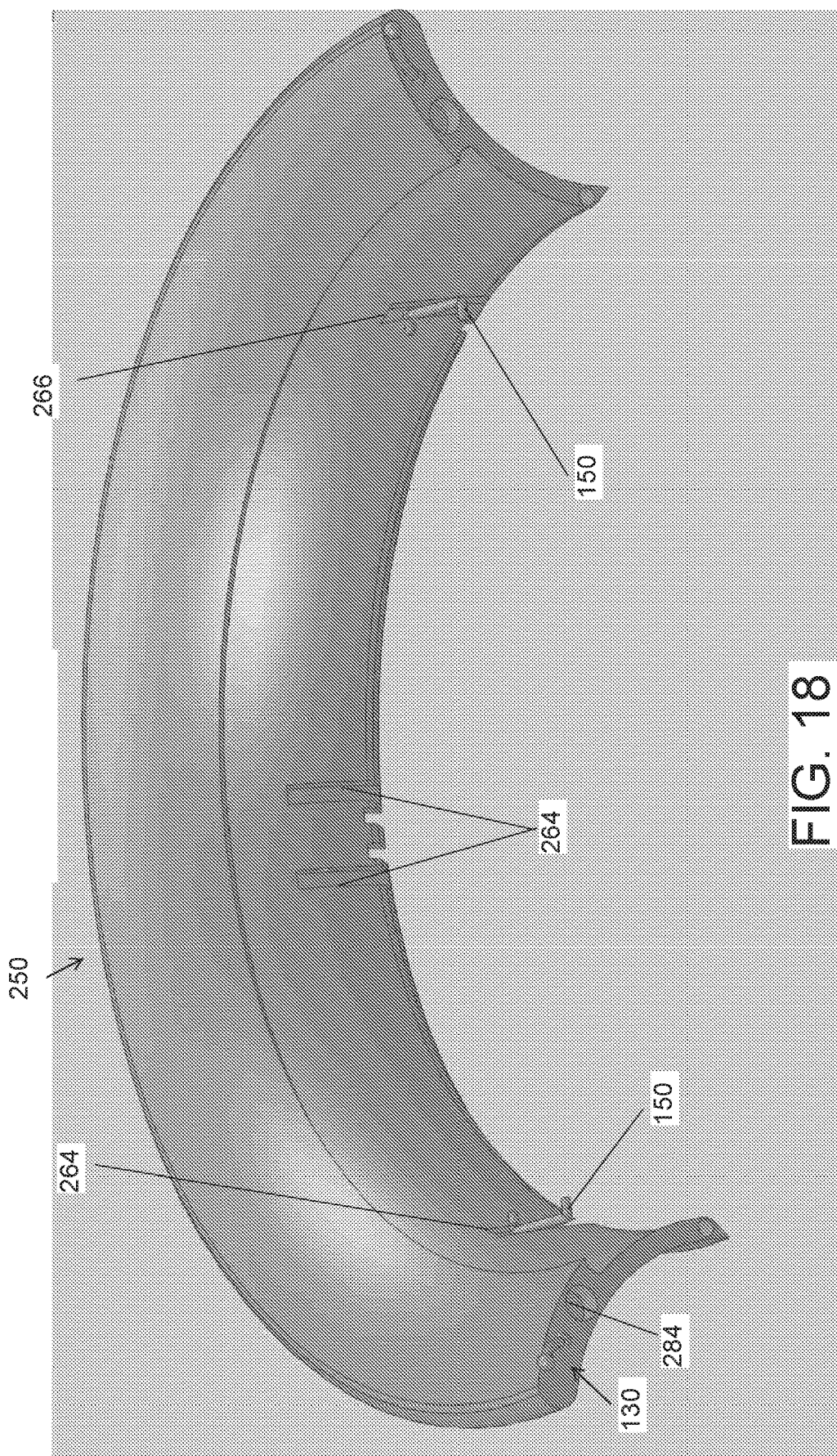
FIG. 18 illustrates an interior perspective view of the movable section with the apparatus of FIG. 3.

FIG. 18 illustrates an interior perspective view of the movable duct section 250 adapted to be used with the apparatus 100 of FIG. 3, being represented by the links 130 and 150. The movable duct section 250 comprises cutouts 266 to pivotally receive one end of the link 150. The link seat 264 may be provided within the movable duct section 250 even if the link 140 is not being used.

Figure 19:
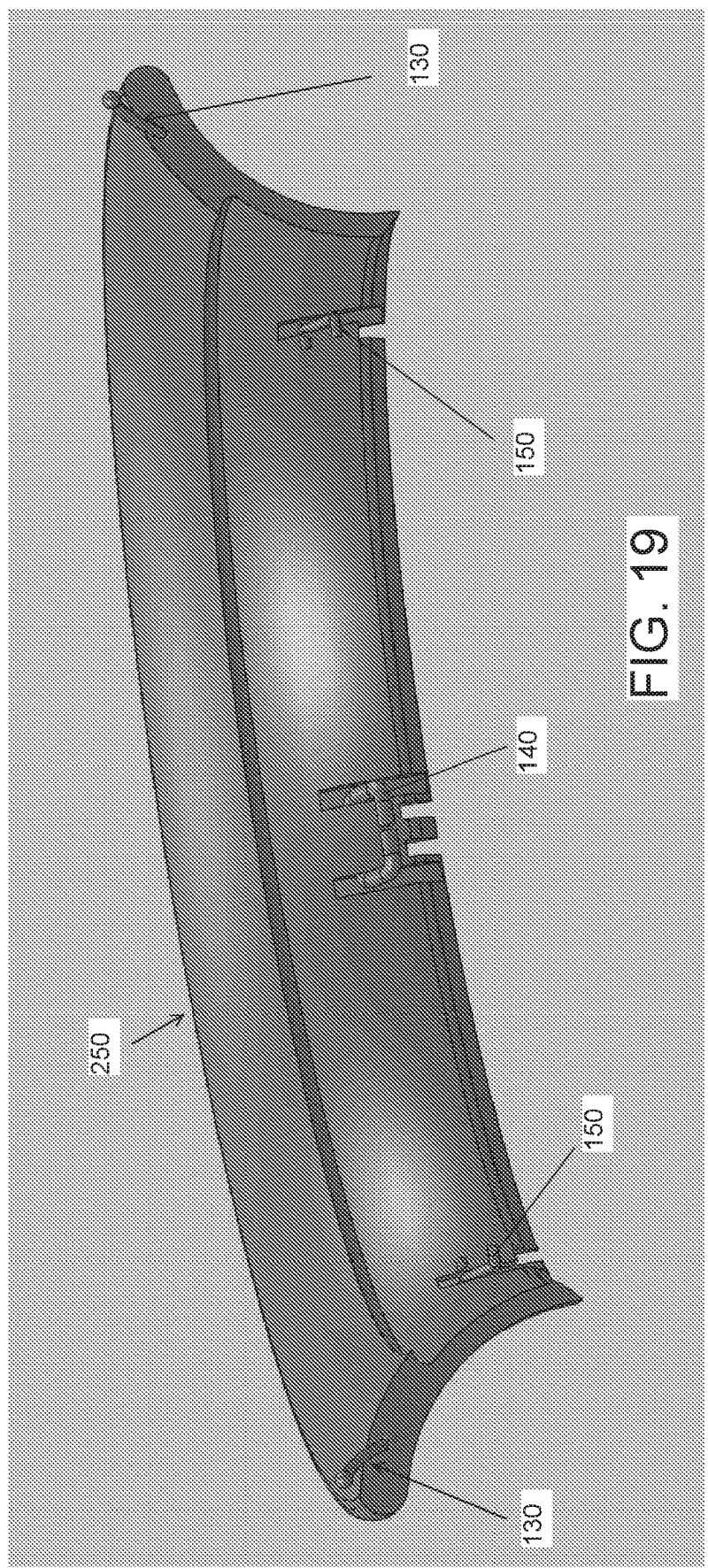
FIG. 19 illustrates an interior perspective view of the movable section with the apparatus of FIG. 4.

FIG. 19 illustrates an interior perspective view of the movable duct section 250 adapted to be used with the apparatus 100 of FIG. 4, being represented by the links 130, 140, and 150.

Figure 20:
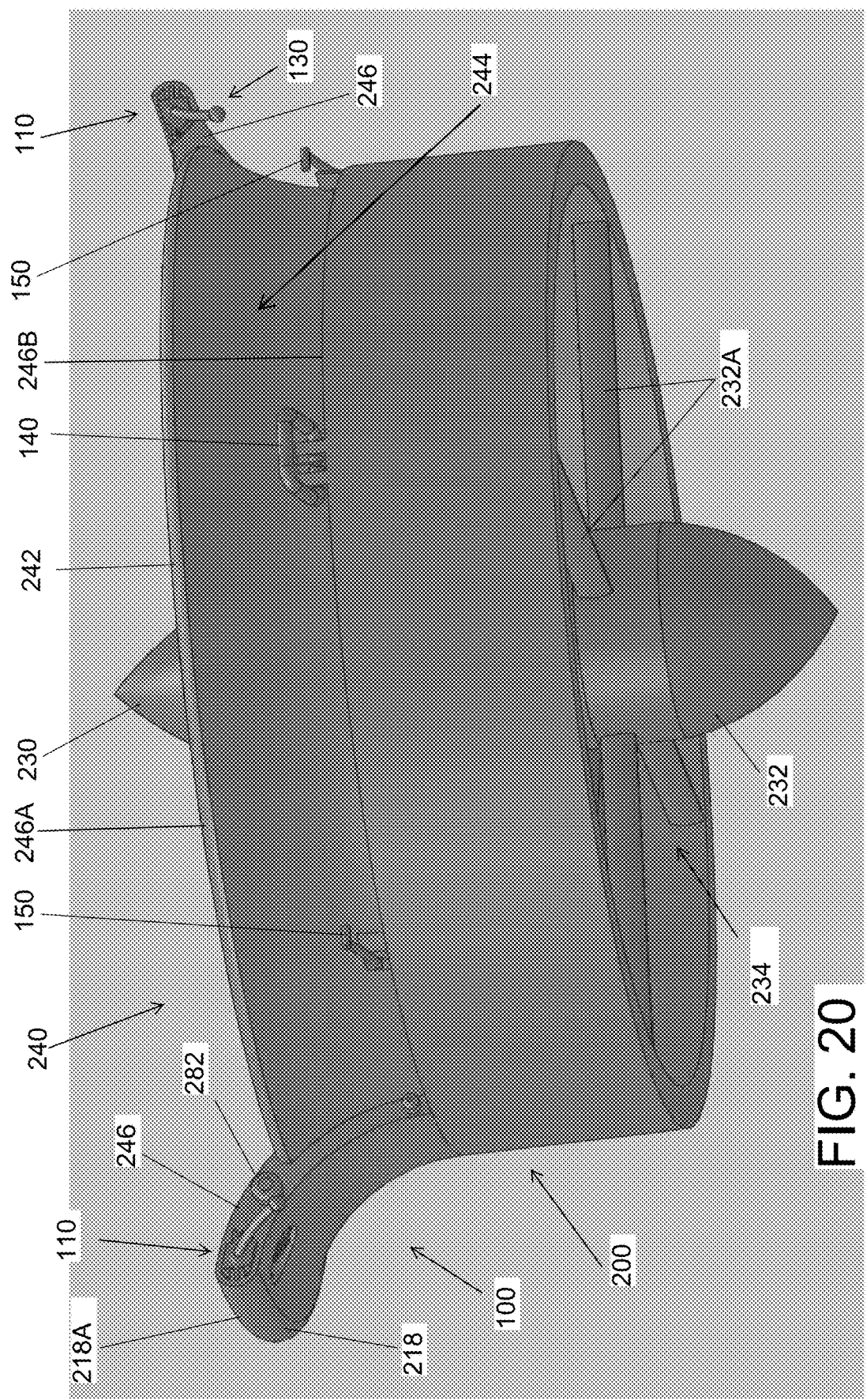
FIG. 20 illustrates a perspective view of a ducted fan propulsion with a movable section being removed.

FIG. 20 illustrates a perspective view of a ducted fan propulsion 200 with a movable duct section 250 being removed and being adapted for use with the apparatus 100 of FIG. 4, as described above. The position of actuators 110 and the actuating links 130 illustrates retracted position of the movable duct section 250. Actuators 110 are disposed in a cavity in a side edge 246. Control links 140 and 150 are illustrated as being disposed in a spaced apart relationship with each other along a leading edge 246A of the cutout 240. Control links 140 and 150 may be referred to as a control linkage. An inner edge 246B is disposed at a distance from the leading edge 246A. A portion 244 of the housing 210 that is disposed between the side edges 246 and between the leading edge 246A and the inner edge 246B has a thickness being smaller than the thickness of the housing 210. The portion 244 thus has a reduced thickness as compared to the thickness of the housing 210 and may be referred to as a reduced duct thickness portion. FIG. 20 also illustrates the curved surface 218A of the leading edge 218, as described above. The stator vanes 232A which support the propeller assembly 233 are also being illustrated.

Figure 21:
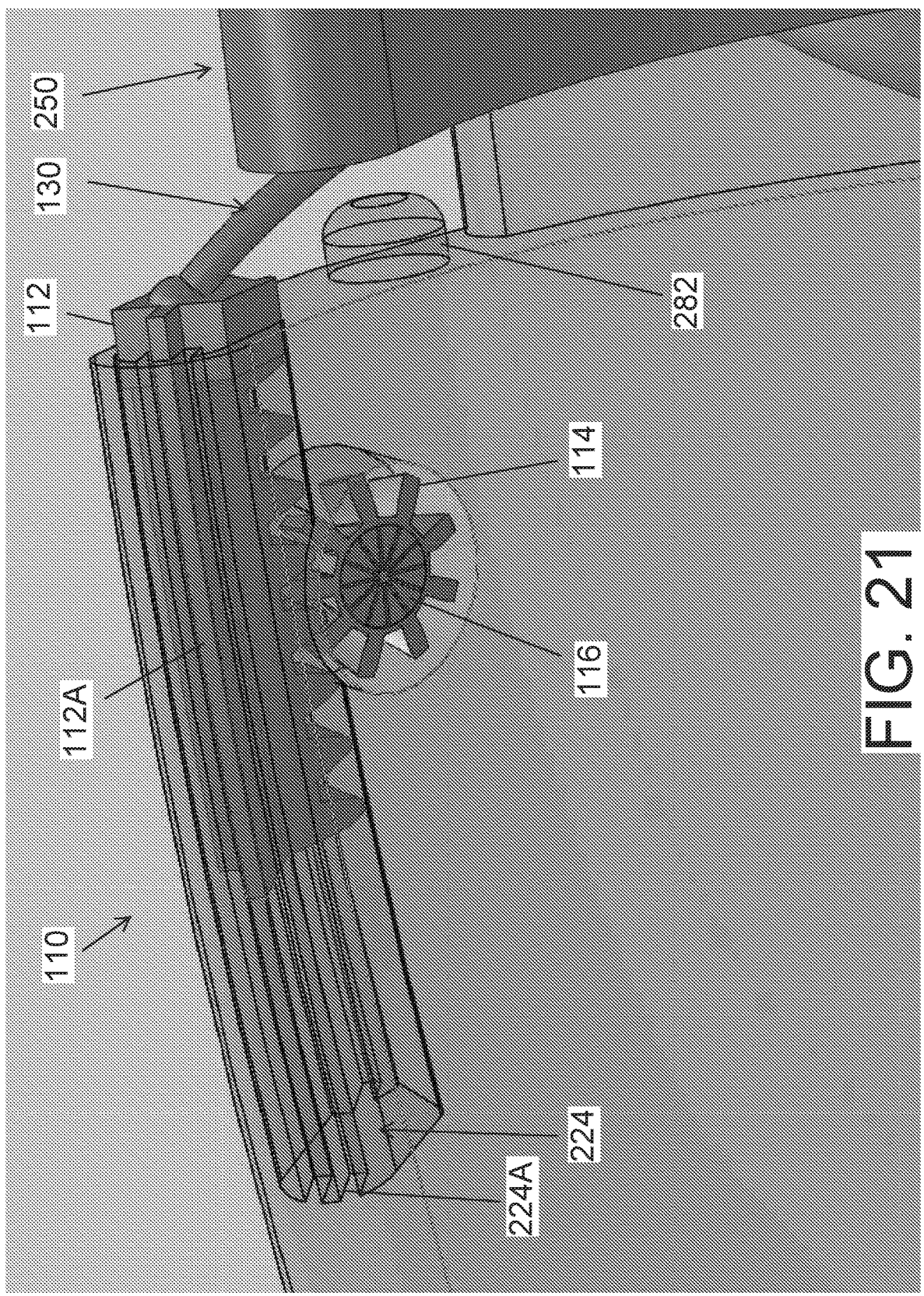
FIG. 21 illustrates a partial perspective view of the ducted fan propulsion of FIG. 20.

FIG. 21 illustrates a partial perspective view of the ducted fan propulsion 200 with the movable duct section 250 being in at least partially extended position. FIG. 21 further illustrates that the rack 112 is mounted for a sliding movement within the cavity 224 provided within the thickness of the duct 210. A guide comprising a projection 212A on the rack 112 and a cavity 224A in the cavity 224 may be provided to guide and facilitate the movement of the rack 112. The cavity 224 may be referred to as a first cavity.

Figure 22:
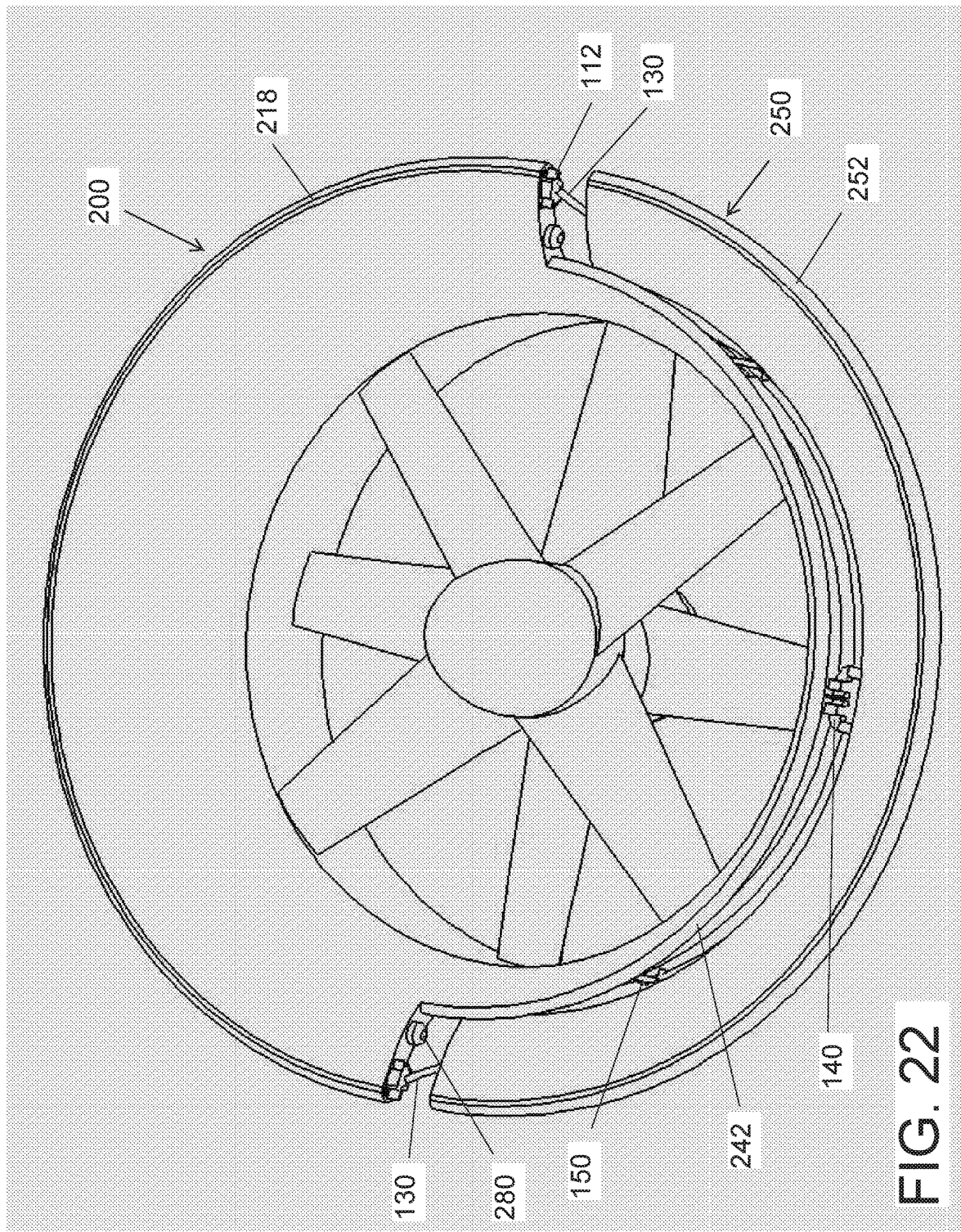
FIG. 22 illustrates a perspective view of the ducted fan propulsion of FIG. 20 with a movable section being in an extended position.

FIG. 22 illustrates a perspective view of the ducted fan propulsion 200 adapted with the apparatus 100 of FIG. 4, as described above, and with a movable duct section 250 being in at least partially extended position.

Figure 23:
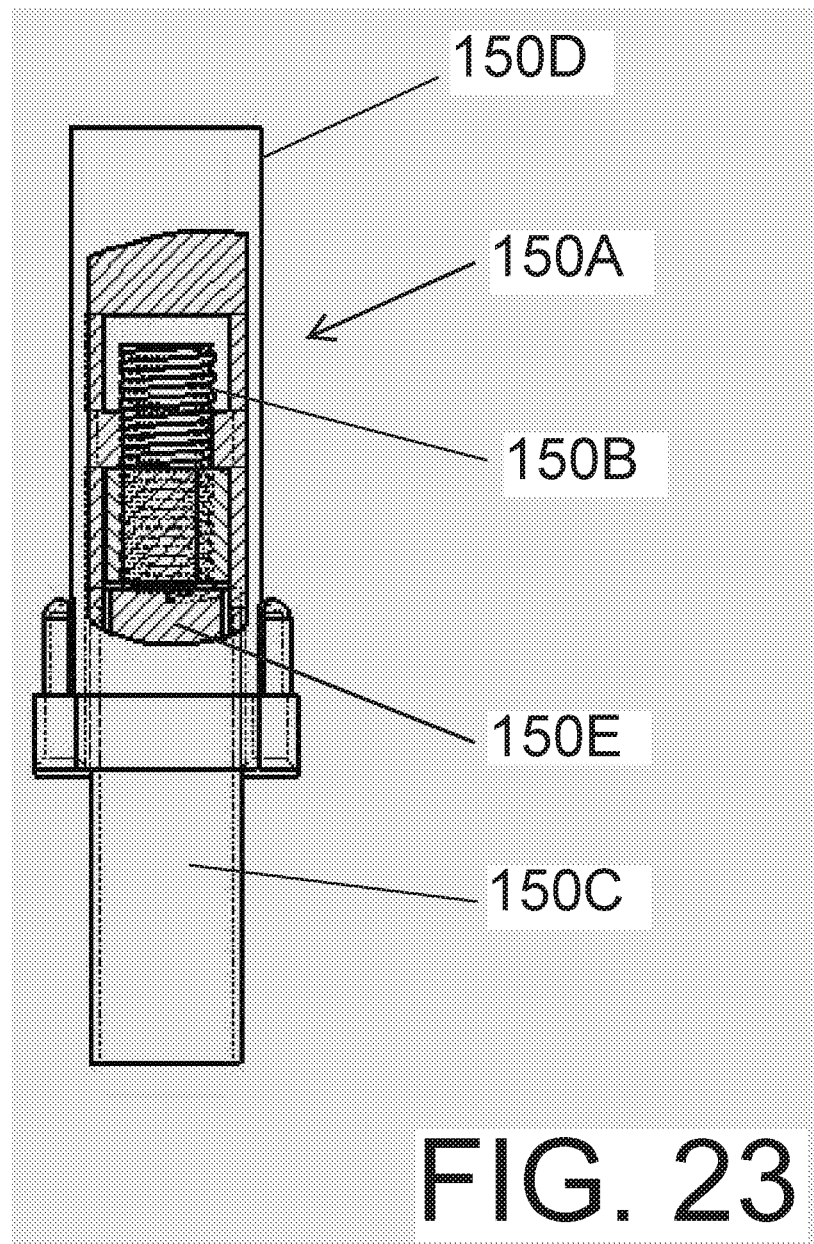
FIG. 23 illustrates a cross-sectional elevation view of an adjustable link employable within the propulsion.

FIG. 23 illustrates a cross-sectional elevation view of an adjustable link 150A that can be employable within the ducted fan propulsion 200 as an alternative to the fixed length links 150. The adjustable link 150A comprises a threaded screw 150B and two housings 150D and 150C that telescope in a relationship to each other upon rotation of the threaded screw 150B with an actuator 150E. The threaded screw 150B has an external thread and remains stationary. The housing 150D has an internal thread and moves with the rotation of the threaded screw 150B. Thus, the threaded screw 150A may be referred as a stationary member and the housing 150D may be referred to as a movable member. The variable links 150A improve movement control of the movable duct section 250. Adjustable link 150A defines a telescoping mechanism.

Figure 24:
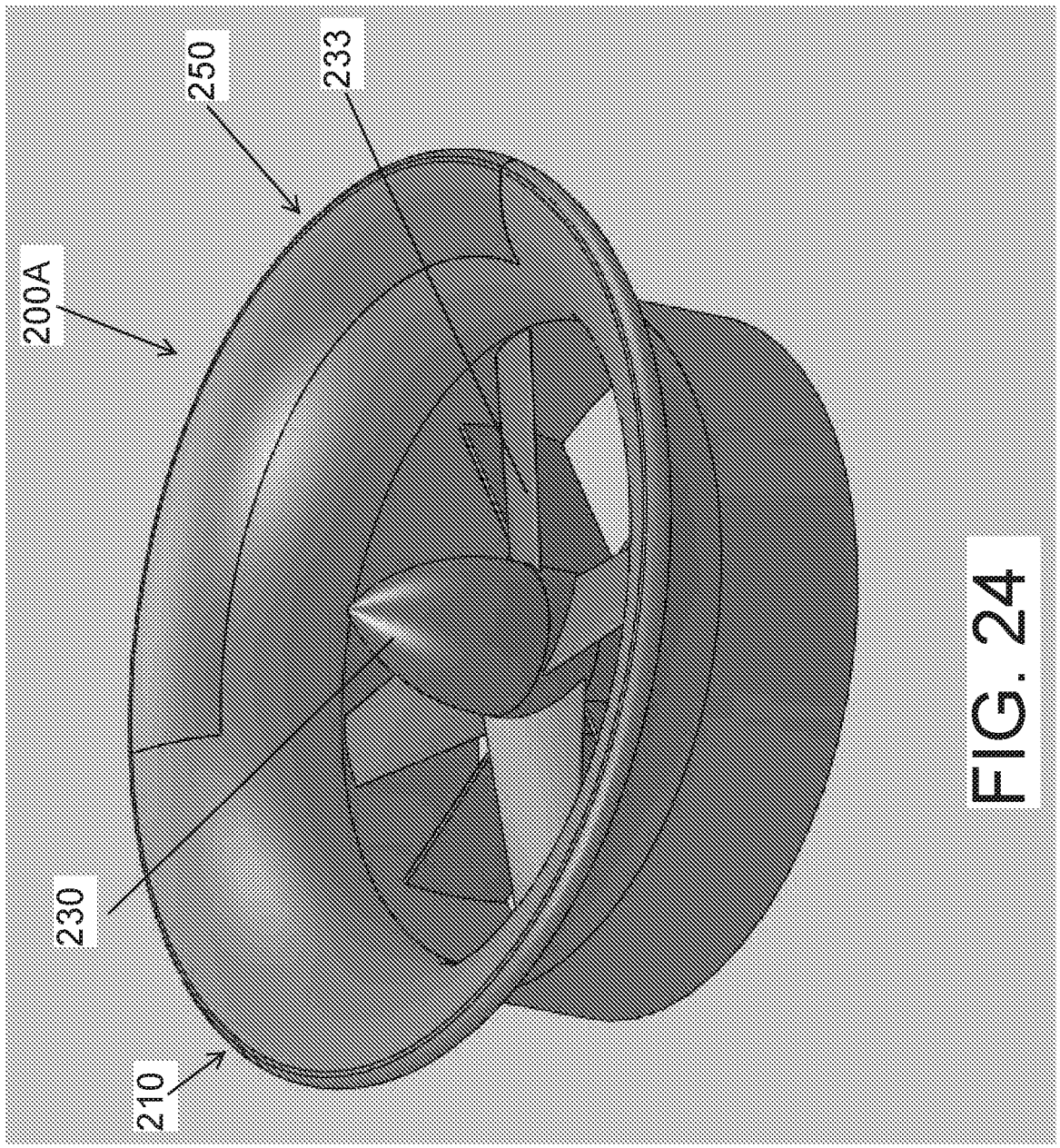
FIG. 24 illustrates a perspective view of a ducted fan propulsion with a single propeller.
Figure 26B:
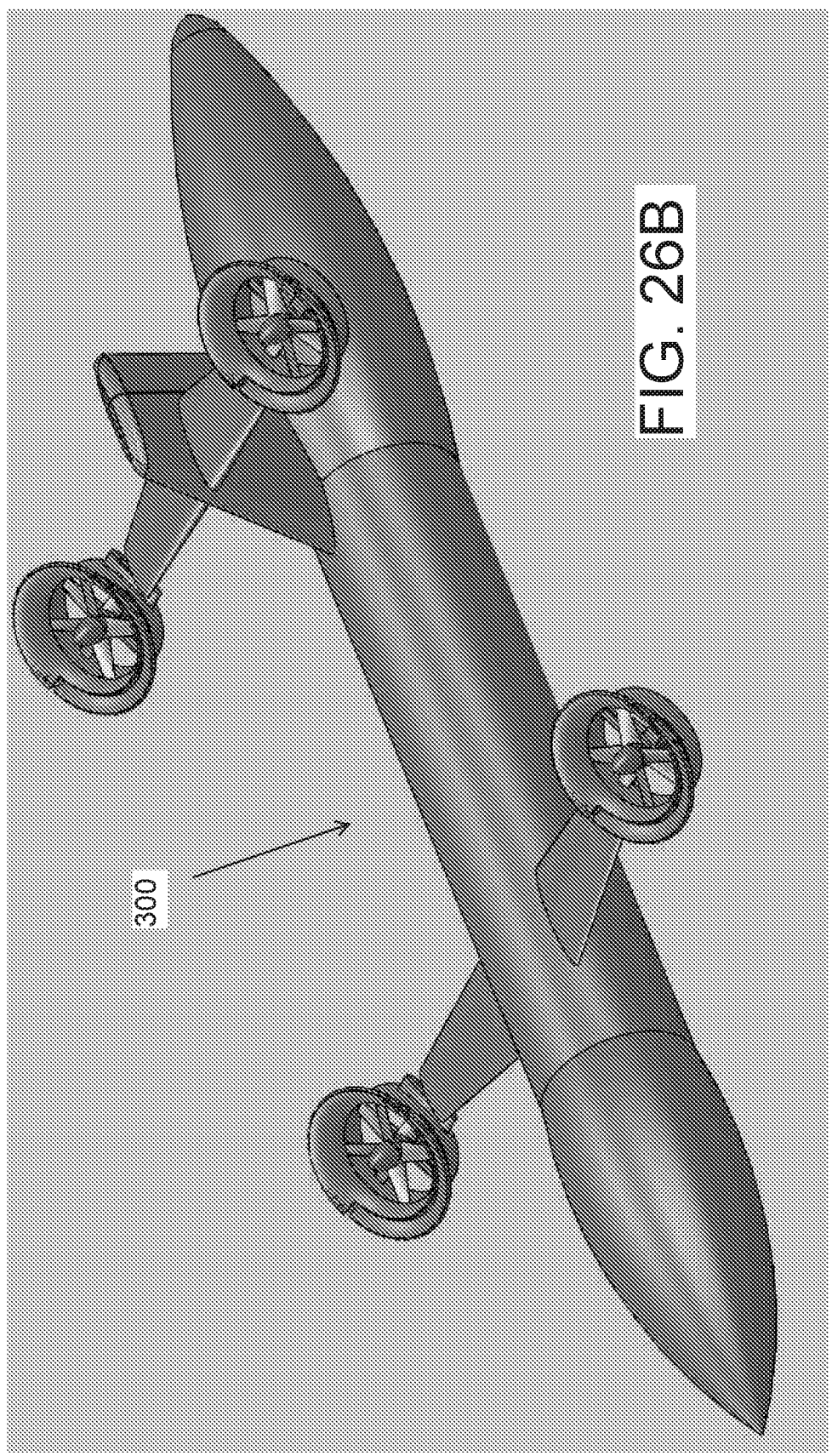
Figure 26D:
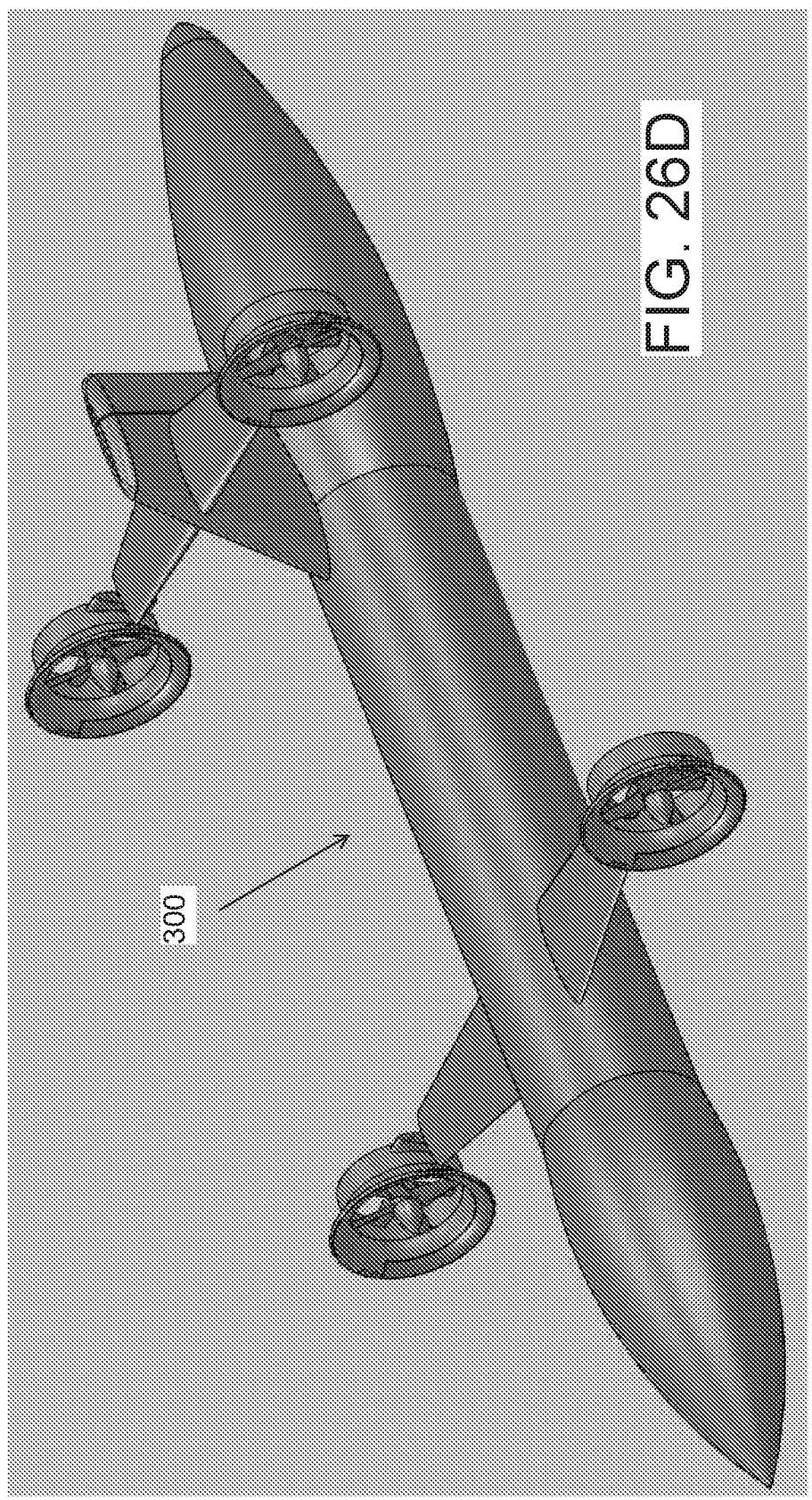

FIG. 24 illustrates a ducted fan propulsion 200A with a single propeller assembly 233 and the inlet cone 230 mounted in the duct 210, as described above, and with a movable duct section 250, as described above. The movable duct section 250 is shown in a retracted position.

FIG. 25 illustrates a partial elevation view of the ducted fan propulsion 200A of FIG. 24 with the movable duct section 250 is shown in the extended position, exposing the cutout 240 and the apparatus 10, 100.

FIGS. 26A-D illustrate a vehicle 300 with a frame 310 and employing the ducted fan propulsion 200, 200A as described above. FIGS. 26A-D further illustrate a movement diagram of the ducted fan propulsion 200, 200A between the forward flight and the vertical landing or vertical takeoff. When the vehicle 300 is in a hover mode after the vertical takeoff, as is being illustrated in FIG. 26A, the movable duct section 250 is commanded to extend. The movable duct section 250 remains extended as the duct 210 rotates, as is being illustrated in FIGS. 26B-24C, as the vehicle transitions into the forward flight. When the vehicle transitioned into the forward flight when the duct 210 is in a generally horizontal position, the movable duct section 250 is commanded to retract into the duct 210, as is being illustrated in FIG. 26D. When the vehicle is transitioning to a vertical landing from a forward flight the process is reversed. Although, the vehicle 300 has been illustrated as comprising four (4) ducted fan propulsions 200, 200A, more or less can be sued, depending on the design of the vehicle 300. Furthermore, depending on a construction of the frame 310, the movable duct section may be positioned at the top of duct 210 when the duct 210 being in a generally horizontal position in a forward or level flight.

Figure 27:
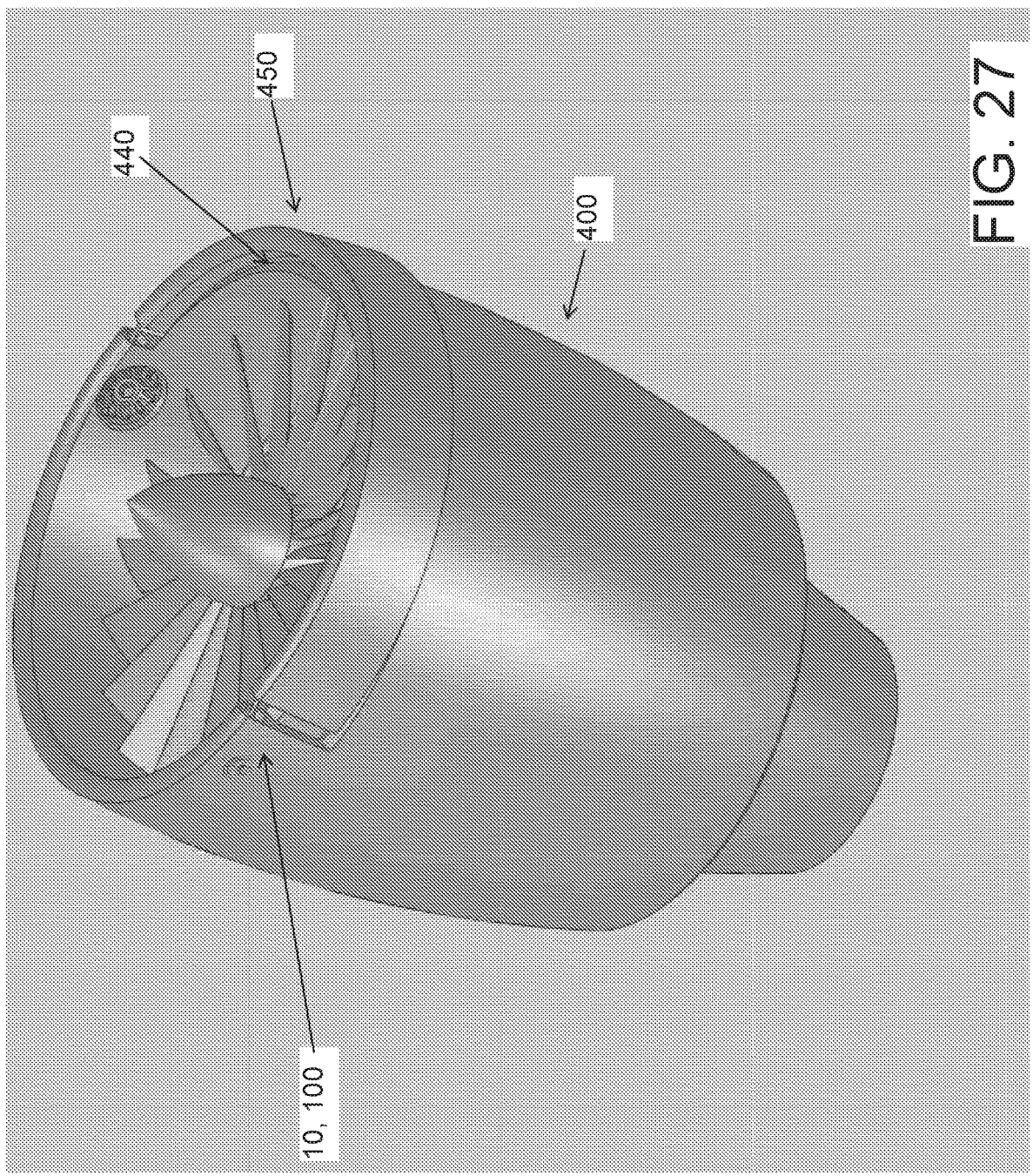
FIG. 27 illustrates a perspective view of a turbo fan jet propulsion, incorporating a movable section being in an extended position.

FIG. 27 illustrates a perspective view of a turbo fan propulsion 400 with a movable duct section 450 being in an extended position and revealing the cutout 440. The movable duct section 450 may be constructed similar to the movable duct section 250, except for curvature to accommodate curvature of the turbo fan propulsion 400. The turbo fan propulsion 400 can be adapted with either the apparatus 10 or the apparatus 100, partially shown in FIG. 27.

Thus, in view of the above, the present disclosure further teaches an apparatus for a movable duct section of a propulsion, the propulsion including a hollow housing with a duct and a cutout in the duct at a leading edge thereof, the leading edge being disposed radially to a flow axis of the propulsion, the movable duct section being sized and shaped to fit within the cutout, the apparatus comprising an actuator, the actuator being disposed in a cavity in the duct during use of the apparatus, the cavity being disposed, in an open communication with the cutout and a linkage, the linkage coupling, during the use of the apparatus, the movable duct section to each of the actuator and the duct, where the apparatus being configured to selectively move the movable duct section between a retracted position where the movable duct section being integrated with the duct and an extended position where the movable duct section being separated from the duct.

Where in the retracted position, the movable duct section is being disposed within the cutout, where an exterior edge of the movable duct section completes the leading edge and an exterior surface of the movable duct section completes an exterior surface of the duct.

Where the actuator may comprise two actuators and the cavity may comprise two cavities, each actuator from the two actuators being disposed in a respective cavity from the two cavities, the respective cavity being further disposed, in an open communication with a side edge of the cutout, the side edge being disposed in a direction of the flow axis.

Where the linkage may comprise two actuating links and a control link, each actuating link from the two actuating links being coupled, at one end thereof, to a respective actuator from the two actuators and being coupled, at an opposite end thereof, to one end of the movable duct section, the one end being disposed adjacent a respective side edge of the cutout when the movable duct section being in the retracted position, the control link coupling the movable duct section, mediate ends thereof, to a leading edge of the cutout, the leading edge being disposed normal to the flow axis.

Where the linkage may comprise two actuating links and two control links, each actuating link from the two actuating links being coupled, at one end thereof, to a respective actuator from the two actuators and being coupled, at an opposite end thereof, to one end of the movable duct section, the one end being disposed adjacent a respective side edge of the cutout when the movable duct section being in the retracted position, and each control link from the two control links coupling the movable duct section, mediate ends thereof, to a leading edge of the cutout, the leading edge being disposed normal to the flow axis.

Where the linkage may comprise two actuating links and three control links, each actuating link from the two actuating links being coupled, at one end thereof, to a respective actuator from the two actuators and being coupled, at an opposite end thereof, to one end of the movable duct section, the one end being disposed adjacent a respective side edge of the cutout when the movable duct section being in the retracted position, and one control link from the three control links couples a middle of an inner edge of the movable duct section to a leading edge of the cutout, the leading edge being disposed normal to the flow axis, and remaining two control links from the three control links couple the inner edge of the movable duct section to the leading edge of the cutout adjacent the side edges of the cutout.

Where each control link from the two remaining control links comprises one end that engages a link seat in the movable duct section and comprises another end that engages a link seat in the duct.

Where each control link from the two remaining links may comprise a variable length.

Where each control link from the two remaining links may comprise a telescoping mechanism.

Where the telescoping mechanism may comprise a movable member with an internal thread, a stationary member with an external thread, the external thread operatively meshing with the internal thread, and a drive, the drive casing being coupled to the stationary member and the drive rotor being configured to rotate the stationary member so as to reciprocally move the movable member along a length of the stationary member.

Where each control link from the three control links may engages a link seat in the movable duct section and may comprise another end that engages a link seat in the duct.

Where the actuator may comprise a rack, the each actuating link being pivotally attached to one end of the rack, a pinion, the pinion being in a meshed engagement with the rack, and a drive, the drive configured to rotate the pinion, the rack movable between a first position corresponding to the retracted position of the movable duct section and a second position corresponding to the extended position of the movable duct section.

Where the cavity being in an open communication with a leading edge of the cutout and wherein the linkage comprises an actuating link, the actuating link being coupled, at one end thereof, to the actuator and being coupled, at an opposite end thereof, to inner edge of the movable duct section, and three control links, two control links from the three control links couple ends of the movable duct section to side edges of the cutout and a remaining third links couples an inner edge of the movable duct section to a leading edge of the cutout.

Where each control link from the two control links may comprise a damper, the damper being disposed, during the use of the apparatus, in a duct cavity, the duct cavity being disposed in an open communication with the cutout and adjacent the leading edge.

Where the apparatus may further comprise an interlock between the movable duct section and the duct.

Thus, in view of the above, the present disclosure further teaches an apparatus for a movable duct section of an axial flow ducted fan propulsion in a vertical takeoff and landing (VTOL) aircraft, the movable duct section being disposed in a cutout in a duct of a hollow duct at a leading edge thereof, the leading edge being disposed radially to a flow axis of the axial flow ducted fan propulsion, the apparatus comprising two actuators, each actuator from the two actuators being disposed in a cavity in the duct during use of the apparatus, the cavity being in an open communication with the cutout, and a linkage, the linkage coupling, during the use of the apparatus, the movable duct section to each of the actuator and the duct, the apparatus configured to selectively move the movable duct section between a retracted position where the movable duct section is disposed within the cutout so that an exterior edge of the movable duct section completes the leading edge of the duct and an exterior surface of the movable duct section completes an exterior surface of the duct of the duct and an extended position where the movable duct section is separated from each of the leading edge and the duct of the duct.

Where the linkage may comprise two actuating links and a control link, each actuating link from the two actuating links being coupled, at one end thereof, to a respective actuator and being coupled, at an opposite end thereof, to one end of the movable duct section, the control link coupling the movable duct section, mediate ends thereof, to a remaining portion of the duct that defines the cutout.

Where the control link may comprise a fixed length.
Where the control link may comprise a variable length.
Where each actuating link may be sized and shaped to be disposed within the cavity when the movable duct section occupies the cutout.

Where each actuator comprises a rack, the each actuating link being pivotally attached to one end of the rack, a pinion, the pinion being in a meshed engagement with the rack, and a drive, the drive configured to rotate the pinion, the rack movable between a first position corresponding to the retracted position of the movable duct section and a second position corresponding to the extended position of the movable duct section.

Where the drive may comprise an electromagnetic clutch and brake assembly.

Where the drive may comprise comprises a rotary drive.
Where the apparatus may further comprise an interlock between the movable duct section and the duct.

Where the interlock may comprise a projection on one of a side edge of the cutout and an side edge of the movable duct section and a cavity in an opposite one of the side edge of the cutout and the side edge of the movable duct section.

Thus, in view of the above, the present disclosure further teaches a ducted fan propulsion, comprising a duct with a duct and a hollow interior, the duct defining each of a leading edge and an outlet edge of the duct; a rotor mounted within the hollow interior, the rotor comprising a propeller blade mounted for a rotation; a drive assembly configured to rotate the propeller blade; a cutout in the duct at the leading end; a movable duct section, the movable duct section being shaped and sized to fit within the cutout; two actuators, each actuator from the two actuators being disposed in a cavity in the duct, the cavity being in an open communication with the cutout; two actuating links, each actuating link from the two actuating links being coupled, at one end thereof, to a respective actuator and being coupled, at an opposite end thereof, to one end of the movable duct section; and a control linkage, the control linkage coupling the movable duct section, mediate ends thereof, to a remaining portion of the duct; the two actuators are operable to selectively move, through the actuating and control linkages, the movable duct section between a retracted position where the movable duct section is disposed within the cutout so that an exterior edge of the movable duct section completes the leading edge and an exterior surface of the movable duct section completes an exterior surface of the duct and an extended position where the movable duct section is separated from each of the leading edge and the duct.

Where each actuator may comprise a rack, the each actuating linkage being pivotally attached to one end of the rack; a pinion, the pinion being in a meshed engagement with the rack; and a drive, the drive configured to rotate the pinion; the rack movable between a first position corresponding to the retracted position of the movable duct section and a second position corresponding to the extended position of the movable duct section.

Where the one end of the rack is disposed within the cutout when the rack moved into the second position.

Where each actuating linkage is disposed within the cavity when the rack moved into the first position.

Where the ducted fan propulsion may further comprise an abutment on an end of the cutout and a cavity in a respective end of the movable duct section, the cutout being sized and shaped to receive the abutment when the movable duct section moved into the retracted position.

Where the exterior edge of the movable duct section comprises a curved surface.

Thus, in view of the above, the present disclosure further teaches a vertical takeoff and landing (VTOL) vehicle, comprising a vehicle body; and a propulsion pivotally carried and on the vehicle body, the propulsion arranged to force an ambient fluid therethrough and thereby to generate each of an upward thrust and a horizontal thrust; the propulsion comprising a movable duct section, the movable duct section movable, through an actuator and a linkage, between an extended position during a generation of the upward thrust and a retracted position during a generation of the horizontal thrust; the movable duct section being inclined relative to a duct in the extended position.

Where the movable duct section may comprise a plurality of movable duct sections.

Thus, in view of the above, the present disclosure further teaches a method of transitioning a vertical takeoff and landing (VTOL) vehicle from a vertical take-off to a level flight, the VTOL comprising a ducted fan propulsion with a duct having a leading edge, the method comprising rotating, after the vertical take-off, the ducted fan propulsion from a generally vertical position to a generally horizontal position; moving, with an actuator, a movable duct section from a cutout in the duct in a direction away from the duct during a rotation of the ducted fan propulsion from the generally vertical position to the generally horizontal position; and retracting, with the actuator, the movable duct section into the cutout upon completion of the rotation.

Where moving the movable duct section may comprise positioning an outer edge of the movable section inwardly relative to the leading edge when the duct being in the generally horizontal position.

Where moving the movable duct section may comprise positioning the movable duct section at an angle relative to the duct.

Where moving the movable duct section may comprise positioning an outer edge of the movable section outwardly to a leading edge of the cutout when the duct being in the generally horizontal position.

Thus, in view of the above, the present disclosure further teaches a ducted fan propulsion, comprising a duct with a duct and a hollow interior, the duct defining each of a leading edge and an outlet edge of the duct; a rotor mounted within the hollow interior, the rotor comprising a propeller blade mounted for a rotation; a drive assembly configured to rotate the propeller blade; a cutout in the duct at the leading edge; a movable duct section, the movable duct section being shaped and sized to fit within the cutout; an actuator, the actuator being disposed in a cavity in the duct during use of the ducted fan propulsion, the cavity being disposed, in an open communication with the cutout; and a linkage, the linkage coupling, during the use of the apparatus, the movable duct section to each of the actuator and the duct; the actuator operable to selectively move, through the linkage, the movable duct section between a retracted position where the movable duct section is disposed within the cutout so that an exterior edge of the movable duct section completes the leading edge and an exterior surface of the movable duct section completes an exterior surface of the duct and an extended position where the movable duct section is separated from each of the leading edge and the duct.

In the present disclosure, many features are described as being optional, e.g. through the use of the verb "may". For the sake of brevity and legibility, the present disclosure does not explicitly recite each and every permutation that may be obtained by choosing from the set of optional features. However, the present disclosure is to be interpreted as explicitly disclosing all such permutations. For example, an apparatus described as having three optional features may be embodied in seven different ways, namely with just one of the three possible features, with any two of the three possible features or with all three of the three possible features.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, or example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. It will be understood that variations, modifications, equivalents and substitutions for components of the specifically described exemplary embodiments of the disclosure may be made by those skilled in the art without departing from the spirit and scope of the disclosure as set forth in the appended claims.

Any element in a claim that does not explicitly state "means for" performing a specified function, or "step for" performing a specified function, is not to be interpreted as a "means" or "step" clause as specified in 35 U.S.C. § 112, ¶6.

In particular, any use of "step of" in the claims not intended to invoke of the provision of 35 U.S.C. § 112, ¶6.

Furthermore, the Abstract is not intended to be limiting as to the scope of the claimed subject matter and is for the purpose of quickly determining the nature of the claimed subject matter.

What is claimed is:

1. A duct, comprising:
  a housing, the housing including at least:
    a hollow interior;
    an outer surface,
    an inner surface, the inner surface being spaced at a distance from the outer surface to define a duct thickness,
    a leading edge at an inlet end of the duct, and
    a discharge edge at an outlet end of the duct,
    the housing defining a flow axis between inlet and outlet ends;
  a cutout in the housing at the leading edge of the duct, the cutout sized to traverse inner and outer wall surfaces and interrupt the leading edge of the duct, the cutout defining two side edges with each side edge being disposed in a plane being generally aligned with a direction of the flow axis and a leading edge of the cutout disposed in a plane being generally normal to the flow axis, the leading edge of the cutout having a curved surface; and
  a reduced duct thickness portion between the two side edges, the reduced duct thickness portion including at least the inner surface, an outer surface of the reduced duct thickness portion, the outer surface of the reduced duct thickness portion being offset inwardly from the outer surface of the housing.

2. The duct of claim 1, further comprising:
  a cavity in the duct thickness at the each side edge, the cavity disposed adjacent the leading edge of the duct, the cavity being in an open communication with a respective side edge; and
  a link seat in the reduced duct thickness portion.

3. The duct of claim 1, further comprising:
  a cavity in the duct thickness at the each side edge, the cavity disposed adjacent the leading edge of the duct, the cavity being in an open communication with a respective side edge; and
  three links extending outwardly from the reduced duct thickness portion.

4. The duct of claim 1, further comprising a projection on the each side edge.

5. The duct of claim 1, further comprising:
  a cavity in the duct thickness at the each side edge, the cavity disposed adjacent the leading edge of the duct, the cavity being in an open communication with a respective side edge;
  an actuator disposed within the cavity;
  an actuating link connected to the actuator, the actuating link extendable into the cutout; and
  three control links extending outwardly from the reduced duct thickness portion.

6. The duct of claim 1, further comprising:
  a first cavity disposed within the duct thickness at the each side edge adjacent the leading edge of the duct and in an open communication with a respective side edge;
  a damper disposed within the first cavity;
  a link connected to the damper, the link extendable into the cutout;
  a cavity disposed within the duct thickness and extending from an inner edge of the reduced duct thickness portion toward the outlet end of the duct;
  a rack and pinion actuator disposed within the cavity that extends from the inner edge of the reduced duct thickness portion toward the outlet end of the duct;
  a link at the inner edge of the reduced duct thickness portion; and
  a link in a pivotal connection with the link seat and in a pivotal connection with a rack within the rack and pinion actuator.

7. The duct of claim 1, further comprising a rotor mounted within the hollow interior, said rotor comprising a rotatable propeller assembly mounted for a rotation.

8. A duct, comprising:
  a housing including at least a hollow interior, an inner surface, and an outer surface;
  a cutout in the housing at a leading edge of the duct, the cutout sized to traverse inner and outer surfaces of the housing and interrupt the leading edge of the duct, the cutout defining two side edges, each side edge being parallel to a flow axis and a leading edge of the cutout disposed in a plane being generally normal to the flow axis; and
  a reduced duct thickness portion between the two side edges, the reduced duct thickness portion including at least the inner surface, an outer surface of the reduced duct thickness portion, and a second leading edge with a curved surface, the outer surface of the reduced duct thickness portion being offset inwardly from the outer surface of the housing.

9. The duct of claim 8, further comprising:
  a movable duct section being sized and shaped to fit within the cutout; and
  an apparatus configured to selectively move the movable duct section between a fully retracted position and a fully extended position.

10. The duct of claim 9, wherein in the fully extended position the movable duct section being designed to separate from the duct to fully expose the cutout.

11. The duct of claim 10, wherein in the fully retracted position an exterior edge of the movable duct section completes a leading edge of the duct and an outer surface of the movable duct section completes the outer surface of the duct.

12. The duct of claim 9, wherein the apparatus comprises:
  two actuators, each actuator from the two actuators being disposed in a cavity in the housing, the cavity being disposed, in an open communication with the cutout; and
  a linkage, the linkage designed to couple the movable duct section to the each actuator and the housing.

13. The duct of claim 12, wherein the linkage comprises:
  two actuating links, each actuating link from said two actuating links being coupled, at one end thereof, to a respective actuator from the two actuators and being coupled, at an opposite end thereof, to one end of the movable duct section, the one end being disposed adjacent a respective side edge of the cutout when the movable duct section being in the fully retracted position; and
  a control link, said control link coupling the movable duct section to the leading edge of the cutout.

14. The duct of claim 12, wherein the linkage comprises:
  two actuating links, each actuating link from the two actuating links being coupled, at one end thereof, to a respective actuator from the two actuators and being coupled, at an opposite end thereof, to one end of the movable duct section; and two control links, each control link from the two control links coupling the movable duct section to the leading edge of the cutout.

15. The duct of claim 8, further comprising:

a movable duct section being sized and shaped to fit within the cutout; and an apparatus designed with a linkage and an actuator to radially move the movable duct section away from the housing and angle the movable duct section relative to the cutout.

16. The duct of claim 15, wherein the movable duct section comprises a leading edge with a radius of curvature.

17. The duct of claim 8, further comprising:

a movable duct section being sized and shaped to fit within the cutout; and an apparatus designed with a linkage and an actuator to influence flow of fluid at an inlet of the housing into the hollow interior by radially moving the movable duct section away from the housing and angling the movable duct section relative to the cutout.

18. The duct of claim 8, wherein the inner surface being spaced at a distance from the outer surface to define a duct thickness, and the flow axis being between leading and discharge ends of the duct.

19. A duct, comprising:

a housing including at least:
  a hollow interior;
  an outer surface,
  an inner surface, the inner surface being spaced at a distance from the outer surface to define a duct thickness;
  a first leading edge at an inlet end of the duct, and
  a discharge end of the duct,
  the housing defining a flow axis between inlet and discharge ends; and a portion with a thickness being smaller than the duct thickness, the portion including at least the inner surface of the housing, an outer surface of the portion, and a second leading edge, the outer surface of the portion being offset inwardly from the outer surface of the housing, the second leading edge being disposed at a distance from the first leading edge along the flow axis and toward the discharge end, the portion extending from the second leading edge toward the discharge end.

20. The duct of claim 19, further comprising:

a movable duct section having a portion with a thickness being equal to the duct thickness and a portion with a thickness being smaller than the duct thickness; and an apparatus configured to selectively move the movable duct section between a fully retracted position and a fully extended position.

\* \* \* \* \*